United States Patent [19]

Mackenroth

[11] Patent Number: 4,695,958
[45] Date of Patent: Sep. 22, 1987

[54] DIGITAL PACING INDICATOR FOR MOTORCYCLES

[76] Inventor: Kerry Mackenroth, Rte. 2, Box 277, Lacombe, La. 70445

[21] Appl. No.: 866,992

[22] Filed: May 19, 1986

Related U.S. Application Data

[63] Continuation of Ser. No. 692,666, Jan. 17, 1985, abandoned.

[51] Int. Cl.$^4$ .................. G06F 15/14; A63B 21/00; B61L 3/00
[52] U.S. Cl. .................. 364/424; 364/561; 272/73; 116/29; 116/62.3
[58] Field of Search ............ 364/424, 444, 446, 561, 364/565, 569; 434/61; 116/29, 35 R, 62.3; 272/73

[56] References Cited

U.S. PATENT DOCUMENTS

| | | | |
|---|---|---|---|
| 3,816,716 | 6/1974 | DeGarmo | 364/446 |
| 4,071,892 | 1/1978 | Genzling | 364/424 |
| 4,281,389 | 6/1981 | Smith | 364/569 |
| 4,317,106 | 2/1982 | Hüber | 364/561 X |
| 4,371,935 | 1/1983 | Yamaki | 364/561 X |
| 4,387,437 | 6/1983 | Lowrey et al. | 364/561 |
| 4,443,008 | 4/1984 | Shimano | 434/61 X |

OTHER PUBLICATIONS

DeGarmo, R. G., "Navigation Computer", *IBM Technical Disclosure Bulletin*, vol. 14, No. 8, Jan. 1972, pp. 2544–2555.

Primary Examiner—Errol A. Krass
Assistant Examiner—Joseph L. Dixon
Attorney, Agent, or Firm—Keaty & Keaty

[57] ABSTRACT

A form of competitive motorcycle racing termed "Enduro racing" comprises a series of race segments. The object of the race is to traverse each race segment at speeds which are as close as possible to the target speeds for the race segment. Along each race segment may be a check point or a series of check points where the elapsed time required by a contestant is measured, with total score for a race being determined at least in part by the success of the contestant in traversing a previously undisclosed portion of each race segment in a target time corresponding to the time required to traverse that portion of the race segment in the target speed. Thus, it is the contestant's challenge to not only maneuver his motorcycle with considerable skill but to maintain a constant speed, anticipate potential checkpoints along each race segment, and where possible, complete each race segment in the correct amount of time. Accordingly, the instant invention provides an extremely accurate instrument which presents information to the contestant in a simplified visual manner where he should be at any instant in the race and shows concurrently the location, in terms of this "should be" distance, of the next possible check point along a race segment. Thus, the most essential information is constantly displayed to the contestant to simplify the contestant's task of assessing his progress along a race segment, and optimizing a possible score for each segment in the Enduro race.

19 Claims, 9 Drawing Figures

4,695,958

DIGITAL PACING INDICATOR FOR MOTORCYCLES

This is a continuation of co-pending application Ser. No. 692,666, filed on Jan. 17, 1985, now abandoned.

BACKGROUND OF THE INVENTION

A popular form of sport competition involving off-road motorcycles is the Enduro race. An Enduro race challenges the skill of the motorcycle rider by providing a rough terrain course having one or more segments of established distance which must be covered at a constant speed or speeds. The object of the race is to maintain the set or chosen speed over the distance of the course. Due to terrain limitations and for other reasons, it is customary that the course is divided into segments of differing difficulty, each segment having a commensurate speed which is to be maintained.

In order to judge the accuracy with which individual competition riders maintain the desired speed, unannounced checkpoints, manned by racing officals, are established along the course in order to give multiple points at which the time and distance of each rider can be measured. This time and distance in turn indicate whether the rider is ahead of or behind the chosen speed.

Each checkpoint, therefore, provides a score for each rider passing it, and the overall competition results are determined by combining the individual checkpoint scores.

It is customary in Enduro racing that the riders are sequenced into "rows" and that each row, that is, a set of 4 to 5 riders, is sequenced for a start time exactly one minute after the preceeding row and one minute before the row immediately subsequent. Thus, an Enduro race has a plurality of individual one-minute starts, each start being one row of riders. This spacing is intended to ease the official's task in timing and measuring riders.

It is customary, for convenience of monitoring the progress of each rider, that unannounced checkpoints will be positioned at one or more points, selected so that a whole tenth of a mile race distance corresponds exactly to a whole minute of time, timing from the beginning of the race. It should be obvious that with this method of checking, every rider should arrive at the checkpoint at exactly that minute, plus or minus zero seconds representing his relative start position on row; thus the error of timing of an individual rider can be determined from the number of seconds the rider is early or late with respect to his individual minute through the specific checkpoint.

In order to prevent the obvious expedient of simply stopping prior to entering the checkpoint if one is early, the rule is that the rider must continue to proceed; if, at any time a rider stops in sight of a checkpoint, his stop is timed as though passage has occurred. Thus, the individual riders require a method of continuously monitoring their progress.

Enduro racing on motorcycles involves the relatively high speed operation of a motorcycle over rough, back country terrain. The successful operation of the motorcycle under controlled conditions requires the full attention of the rider.

SUMMARY OF THE INVENTION

It is the purpose of this invention to provide an apparatus which, by providing a specific simplified display to a motorcycle operator in an Enduro off-road race, will permit the operator to readily determine the operator's progress with respect to a perfect, best performance run around a given Enduro course.

The apparatus of this invention provides a display, easily interpreted by a Enduro motorcycle rider, which will provide a full indication as to the progress of the race at any point on the circuit. The apparatus in one operation calculates and displays, based on an input race segment length and speed, the distance (corresponding to a motorcycle odometer reading) the rider should have traveled (the "should be" distance) at any time during a perfect (maximum score) race. The apparatus permits a complicated, multi-segment Enduro race to be pre-programmed for sequential display, including an ability to incorporate pauses, to monitor the sequencing of the initial one-minute delay interval start, and to accurately depict the desired status of a rider in a race involving multiple segments with interspersed pauses, including the ability to adapt to variants in the standard mileages of courses, all as established by race course officials.

The apparatus also aids the Enduro racer by providing a display which indicates the possible existence of an unannounced checkpoint so as to give advance warning of those locations on the race course at which the rider should be in full synchronization with the appropriate speed and distance as set forth for the race.

It is thus an object of this invention to provide a display apparatus for an Enduro motorcycle racer which permits the racer to determine his relative status and position with respect to a complex, multi-segmented Enduro off-road race.

It is a further object of this invention to provide a display apparatus for aiding an Enduro motorcycle rider which will permit the rider to determine those points during an Enduro race when the greatest accuracy in time and distance should be attained for best score.

It is a further object of this invention to provide a display apparatus for aiding an Enduro motorcycle rider which will permit correct display of the rider's relative progress in a race including one or more segments in which the mileage, for race purposes, is artificially established at an arbitrary value.

It is a further object of this invention to provide a display apparatus for aiding an Enduro motorcycle rider which will, alternatively, aid said motorcycle rider in synchronizing the rider startup, relative to the period start position of those riders preceeding him, and alternatively providing a capability for displaying the rider's relative position from an instant start.

It is a further object of this invention to provide a single unitized display for an Enduro motorcycle rider which will provide all necessary information for permitting the rider to continuously determine his performance throughout the road race.

These and other objects of the invention will be more evident from the detailed description of the preferred embodiment which follows.

DETAILED DESCRIPTION OF THE PREFERRED EMBODIMENT

Figure 2:
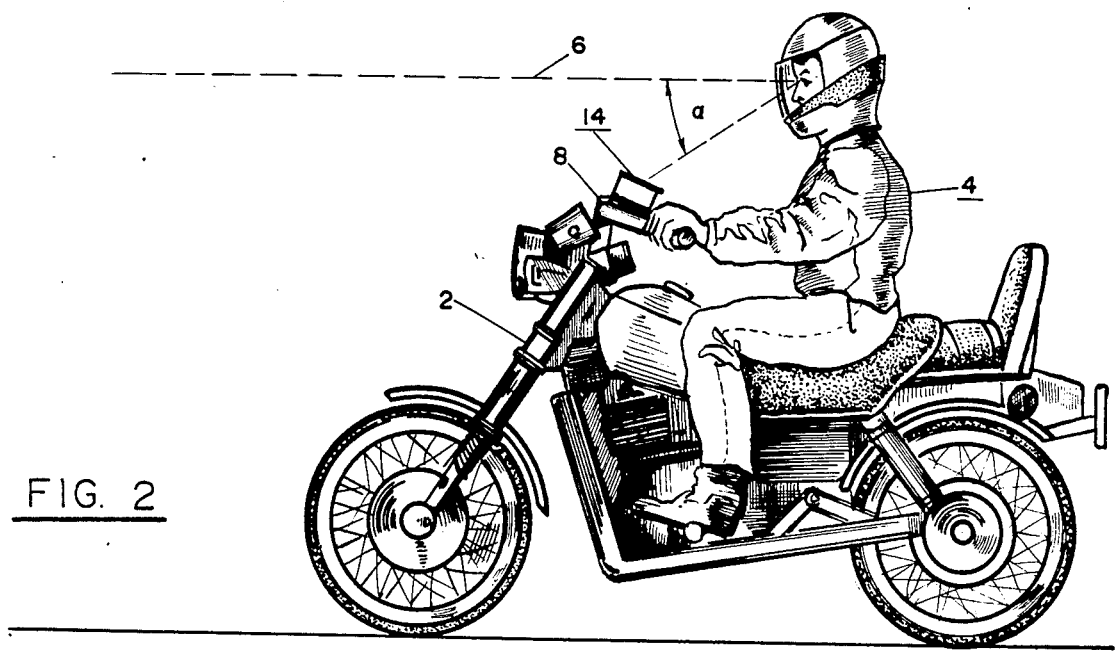
FIG. 2 depicts, in figurative form, the relative positioning of an Enduro motorcycle rider and a motorcycle positioned for riding in an Enduro road race, depicting thereby the rider's relative body position in line of sight.

Referring now to FIG. 2, a general depiction of a motorcycle 2 with mounted rider 4 is shown, so as to illustrate the typical positioning of a rider 4 and the line of sight 6 available to the rider in the mounted position.

The particular apparatus (14) of the invention, shown in FIG. 1 and described below, is intended to be used to aid such a rider, mounted on a motorcycle, in the environment of an Enduro off-road race course. Such a race course comprises a closed travel loop over rough terrain having multiple race segments. Each such race segment is intended to test the skill of riders in off-road racing and is chosen to present a particular type of difficulty in travel; examples would be a narrow logging road or trail through heavily wooded areas, areas of heavy gullying or hills, presenting an up and down travel, or any similar topography having determinable characteristics and difficulties.

For each such segment there is a defined race course distance representing the length of travel: the distance a given motorcycle 2 would travel in following the segment. A desired speed of travel along the segment is selected by the authorities or race committee establishing the race; the speed is chosen so that only the most skilled riders 4 would be able to achieve and hold the chosen speed along the type of terrain chosen for the particular segment.

The objective of the race is for every rider 4 to achieve and hold the desired speed along each of the segments for the duration of the race. It is expected that the average Enduro off-road race will last for a number of hours. Various limitations, including limited areas of land upon which to place a race course are such that it is often necessary that the race repeatedly loop a chosen race course. It is therefore customary that a race, having a course consisting of a number of segments which are sequentially ridden at varying chosen speeds, may consist of a number of complete circuits of the race course. It is customary at the end of each circuit of a race course in which the rider 4 will arrive back at a start position 50, that a time pause will be built into the race schedule. This time pause is generally intended such that a large number of the riders, who otherwise would not be expected to complete an initial circuit of the race course within the chosen time, will be able to complete it and will thus restart the second circuit on an approximately even basis; this produces a closer and more competitive result than would otherwise occur.

It can thus be seen that the overall Enduro road race consists of a number of segments of varying distance, each to be ridden at a specific speed, with the possibility of intervening periods in which a stoppage or rest point will occur.

Since the scoring of the Enduro road race depends upon determining whether the riders are maintaining a constant speed along each of the segments, it is necessary to periodically judge the rider's progress with respect to the position they should hold. For this reason a number of unannounced checkpoints are established by the race committee along the race course.

As is known in Enduro road racing, in order to ease the timing and scoring workload upon the race officials at each of the checkpoints, riders are started along each race course in groups or "rows", each such row being started in sequence at exactly one minute intervals. It has been determined that when checkpoints are established only at points where a motorcycle, proceeding exactly on the desired speed on the desired course, would reach an exact tenth of a mile position at an exact ending of a minute of time from start, such locations provide a more accurate scoring methodology for the scorekeepers, who must monitor and record the time (early or late) of each of the riders 4 through the race course. Thus unannounced checkpoints are placed along the race course at distances from a start position such that their distance from start is an exact multiple of a tenth of a mile from the start position, and further, such that a race course rider proceeding along the segments at the established speed would arrive at the checkpoint or tenth of a mile multiple at an exact multiple of one minute from the start time of a race.

Figure 3:
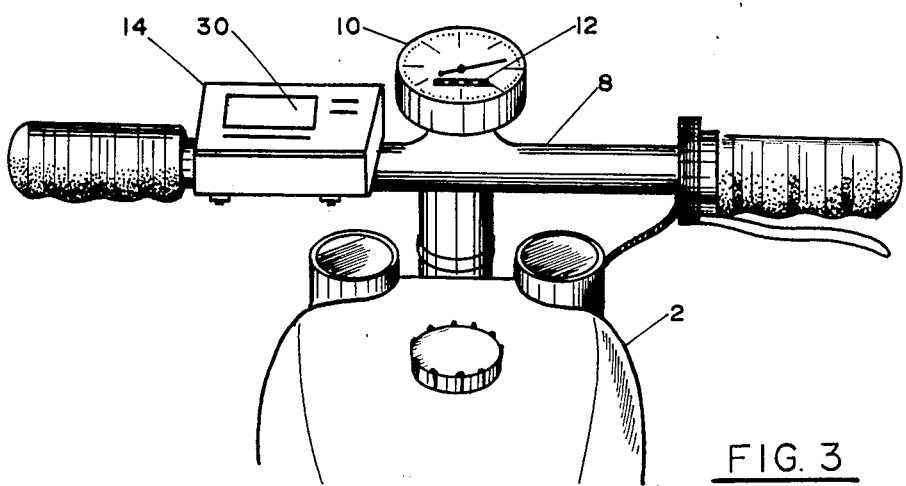
FIG. 3 depicts the positioning of an embodiment of the invention positioned, relative to an Enduro motorcycle, as seen by an Enduro motorcycle rider.

Referring to FIG. 2, the apparatus of the current invention 14 is designed to provide a display so as to provide essential information to a motorcycle rider 4 on a motorcycle 2 during such an Enduro race so as to aid rider 4 in improving rider 4's relative performance within the Enduro race environment described above. Due to the rough terrain and demanding nature of the Enduro race, the rider has a limited capability to divert attention from the actual operation of the motorcycle 2. Thus the apparatus 14 of the current invention is mounted, in coordination with the line of sight 6 of the rider 4, on handle bars 8 of the motorcycle 2 adjacent an instrument cluster 10 (see FIG. 3) so as to provide an easy comparison to an odometer 12 which is found as standard equipment on an Enduro motorcycle 2. It is of course seen that the odometer 12 will at all times provide information as to the actual mileage progress of the motorcycle 2 along the race course.

The apparatus 14, mounted conjointly with the odometer 12, along handle bars 8, is further seen to have the appearance of a generally rectangular box 16 (see FIG. 1) having sides 18 and a face 20 visually apparent to the rider 4. Along a left side 24 of the box 16 are found a first or top button 26 and a second or bottom button 28 for manipulation of internal switches to be described within the apparatus of the invention. Each of top button 26 and bottom button 28 are hermetically sealed for environment protection; in the preferred embodiment by being encased within a flexible covering such as rubber.

Upon the face 20 of the apparatus 14 is found a display 30, the apparatus 14 being mounted such that the display 30 is visually aligned adjacent the odometer 12. The display comprises a plurality of alpha-numeric digits 32, having, as an integrated whole (see FIG. 9): a left alpha-numeric digit 34, a left center alpha-numeric digit 36, a colon position 37, a right center alpha-numeric digit 38 and a right alpha-numeric digit 40. For purposes of describing a preferred display mode of the instant invention, the alpha numeric digits 36, 38 and 40 are hereindescribed as being a first portion of the display 30, and digit 34 is described as a second portion of the display. The four alpha-numeric digits 32 of display 30 also define three inter-digit positions or decimal positions 42 within the display.

Figure 8:
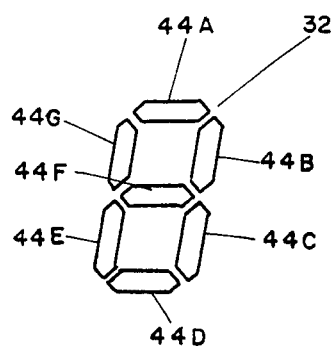
FIG. 8 shows an alpha-numeric digit used in conjunction with the present invention.

Referring to FIG. 8, each of the alpha-numeric digits of the display 30 comprise seven segment displays as well known to the art. These displays comprise seven individually positioned elongate visual members 44A through 44G, which may be individually illuminated or otherwise made visually contrasting to their background, so as to present the ten numeric digits and certain selected alpha characters, including, in this environment, the hyphen, and the letters P, L, H, and E.

Figure 9:
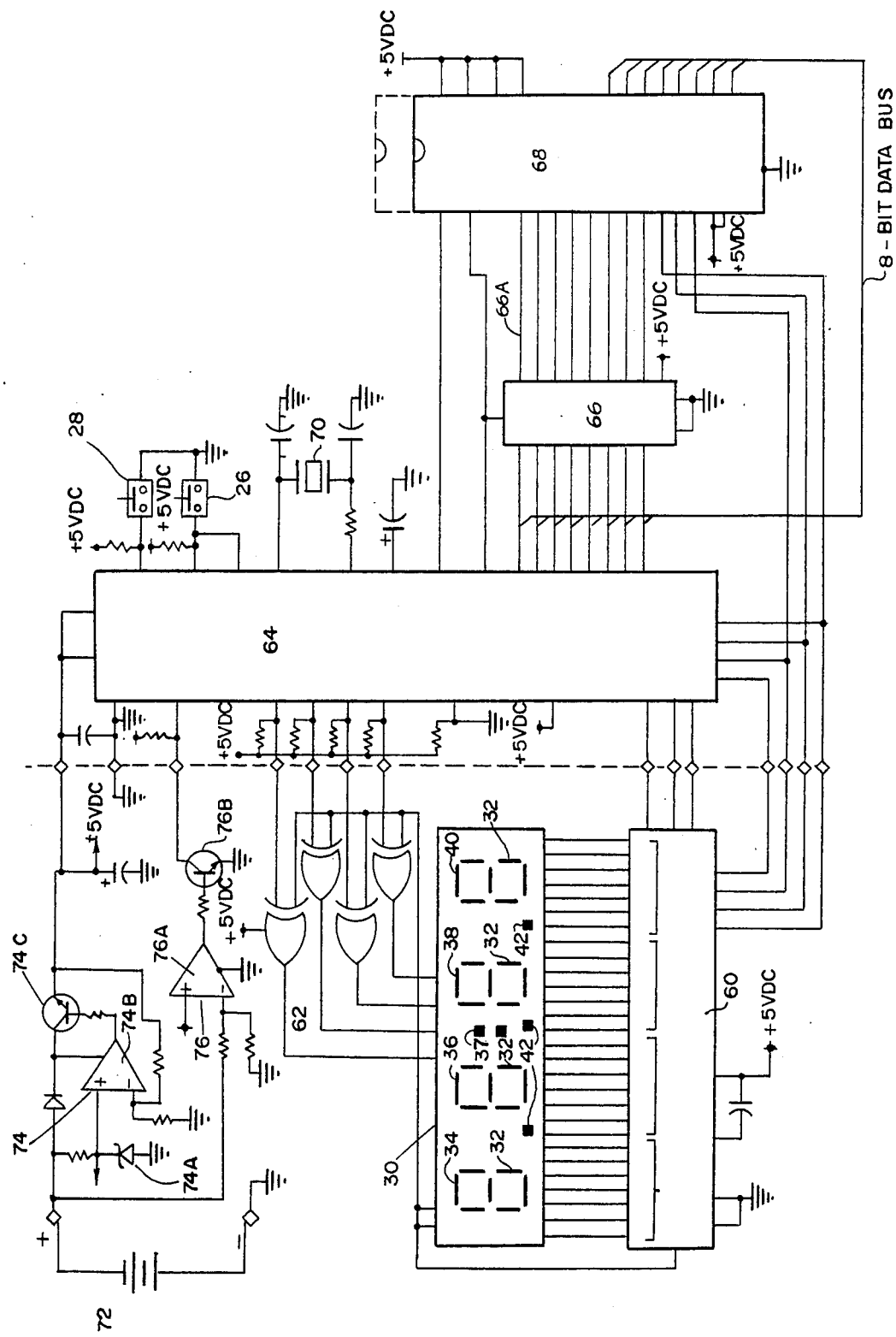
FIG. 9 is an electrical schematic of the preferred embodiment of the invention.

The box 16 of the apparatus is seen to contain electrical circuitry as shown in FIG. 9. This electrical circuitry comprises the alpha-numeric display 30 which is seen to be operably connected with a display driver 60 and decimal driver 62. Each of display driver 60 and a decimal driver 62 in turn are driven by a microcomputer 64. Microcomputer 64 is operably interconnected through an address latch 66 to a non-volatile memory chip or read-only memory (ROM) chip 68. Frequency controlling or crystal circuitry 70 determines a clock frequency for the activation of microcomputer 64. Electrical power is provided to microcomputer 64 through a battery 72. Power battery 72 is reduced to a required 5 volts for operation of microcomputer 64 by voltage regulator circuitry 74. A voltage comparitor circuit 76 detects a low voltage condition on battery 72 for input into microcomputer 64. First button 26 and second button 28 are individually, operably interconnected to microcomputer 64 to provide electrical signals corresponding to the activation thereof.

In the preferred embodiment of the invention, microcomputer 64 is a microcomputer known as a type 80C39. The supporting circuitry is of a known standard type: address latch 66, required to interconnect the specific microcomputer 64 stated here with the specific ROM 68 of the preferred embodiment, is a 74HC373; latch 66 latches and controls address lines 66A interconnecting microcomputer 64 and memory chip 68 which is a 27C64.

Power for operation is provided to microcomputer 64 by voltage regulator 74 which is of a standard design involving a Zener Diode 74A providing a voltage reference to operational amplifier 74B which in turn controls an output current controlling pass transistor 74C. In the preferred embodiment Zener Diode 74A is a 2.5 volt reference Zener, type LM385 connected to a HA514-2/OP20 operational amplifier which drives pass transistor 74C (a 2N4401). The preferred operational amplifier (74B) used is a two-section unit. The second section is utilized to form a low, voltage comparitor 76 which signals a low voltage condition through switching transistor 76B, a 2N4401, connected in an open collector pull-up arrangement to an input pin of microcomputer 64.

Microcomputer 64 is operably interconnected for output to a display driver 62, in this embodiment a 7211AM or alternatively a CD22105A liquid crystal display (LCD) driver. Microcomputer 64 is also operably interconnected through a 4070 quad nor gate, Decimal Driver 62, to liquid crystal (LCD) display 30, providing for controlled display of one or more decimal portions 42 of display 30.

An embodiment of internal software provided in programmable read-only memory 68 is shown in Appendix I.

The computer driven electrical circuitry shown in FIG. 9, executing the software as shown in Appendix I, provides the inventive external display 30 as described below.

In a normal, standby mode, the external display 30 displays no characters and appears blank to the motorcycle rider 4. As shown in FIG. 9, first button 26 is operably interconnected with an interrupt input into microcomputer 64. Activation of first button 26, through the insertion of an interrupt signal into microcomputer 64, activates the software shown in Appendix I transferring display 30 into one of the following modes.

Figure 7:
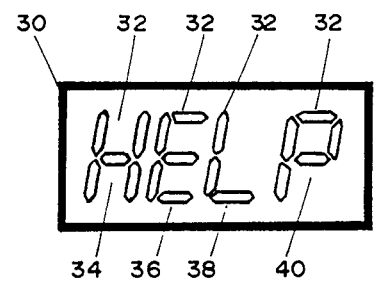

If upon activation, voltage comparitor circuitry 76 detects a low voltage condition in the battery, the software, through microcomputer 64, causes to be displayed upon alpha-numeric display 30 a low battery display the alpha letters H E L P (see FIG. 7) respectively displayed upon the left 34, left center 36, right center 38 and right 40 alpha-numeric positions.

Figure 5:
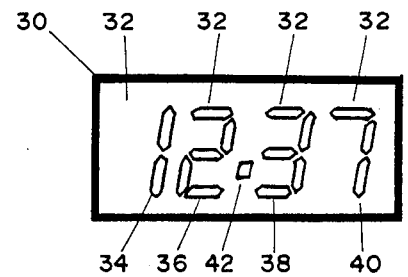

Other operational displays are respectively:

A mileage display, FIG. 5, comprising numeric data in at least the left center 36, right center 38 and right 40 positions. Decimal portion 42 between the left center 36 and the right center 38 is illuminated, thus depicting mileage in units, tenths, and hundreds. For mileage in excess of 9.99 miles, the tens value is shown in left display 34; if the tens value is less than one, left display 34 is blank.

Figure 4:
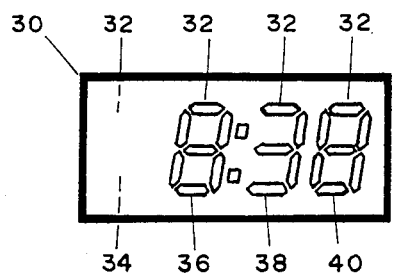
FIGS. 4-7 depict varying embodiments of the display as presented by the apparatus of the invention.

A clock display, FIG. 4, comprising numeric values corresponding to minutes in the left 34 and left center 36 positions, the colon position 37 illuminated, and a seconds value in right center 38 and right 40 digits positions. Two alternative clock displays are available; in the first, right center 38 and right 40 numeric positions provide values equal to the seconds between zero and 60 of the time value concerned. In the alternative mode, right center 38 and right 40 numeric displays provide a decimal value between zero and 99 corresponding to the one-hundredths of a minute of time being counted. The overall alpha-numeric display 30 during the clock display may be that of a clock counting downwards from a preset value to zero time, or of a clock incrementing upwards from a zero time. To distinguish the direction of count, all display digits flash in an on and off manner if the count is downwards.

Figure 6:
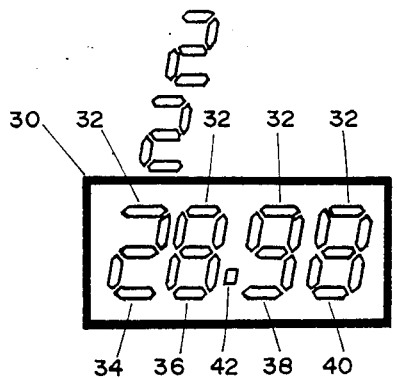

A next checkpoint display, shown in FIG. 6, appears only in conjunction with the mileage display, more specifically, with the "should be" mileage distance being concurrently shown at digits 36, 38 and 40, which digits are termed the first portion of the display 30. Next checkpoint display appears in left numeric digit 34 (previously termed the second portion of the display 30) and is shown as a flashing numeric value corresponding to the tenths of a mile value of the "should be" mileage at which the next checkpoint may be encountered. In the situation exemplified in FIG. 6, the flashing digital value "2" at digit 34 indicates the next possible checkpoint is ahead at a "should be" mileage of 9.2 miles. The next checkpoint display is programatically rendered inoperative for should be mileage values less than three; this is to correlate with a specific rule in Enduro racing that no checkpoint will occur within the first three miles of the start of a race course. A leap back to zero display comprises a form of mileage display in which the mileage values shown are reset to show a value of zero and then reincrement.

Figure 1:
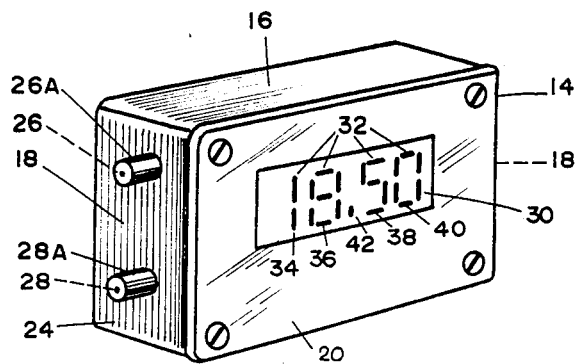
FIG. 1 depicts the apparatus of the invention.

In a program mode, each of digits 34, 36, 38, and 40 are individually incremented to a desired value from a zero value to a nine value as established by the rider 4 by alternative manipulations of top button 26 and bottom button 28 so as to input data corresponding to a given race course (see FIG. 1).

All input is by means of manipulation of first switch 26 and second switch 28. In the preferred embodiment these are buttons or push-type switches, shown schematically in FIG. 9, and physically as shown in FIG. 1, encased in flexible protective coatings or boots 26A and 28A. Manipulation of first switch 26 inserts an electrical value into an interrupt input of microcomputer 64 and into an input port of microcomputer 64. Manipulation of second button 28 inserts an electrical value into a second port of microcomputer 64. Manipulation thus is sensed by microcomputer 64 and timed thereby. The software provides that the activation of switch means 26 or 28 is detected, together with a value representing the length of time switch 26 or switch 28 remain continuously activated. In addition, the wiring of microcomputer 64 and first button 26 is such that the activation of button 26 will be detected by and will activate microcomputer 64 when all of the functions are shutdown or in standby mode.

In operation, the apparatus 14 of the invention is utilized by programming speed and distance data, corresponding to the individual race segments of a race course and pause time data corresponding to the various pauses of the race course. In addition, optionally, programming can input a countdown corresponding to the staging of the one-minute intervals between rows at the start of the race or from an arbitrarily picked start time related to the scheduled time for the individual riders of a row. An alternative programming mode permits input of any segment with an arbitrary starting mileage value overriding the calculated "should be" mileage that otherwise would be determined by microcomputer 64 from the speed and distance data of preceding race segments within a race course.

In operational use, a memory within microcomputer 64 has been programmed by manipulation of switches 26 and 28 to contain a series of values corresponding to:
 the number of minutes delay in the prestart countdown;
 the length, in miles and decimal parts of miles, of each successive race segment of a course, starting with an initial race segment, together with or associated with the speed, in miles per hour, of the specific race segment concerned; or; the length of delay of a pause if the next succeeding race segment is a pause rather than a distance; and
 a code, identified within a race segment, whether the race segment mileage is to be reset to an arbitrary value.

In function, the computer program cycles through the aforementioned stored memory data as follows. The rider 4 activates apparatus 14 at a prestart coundown by activating or depressing first button 26 (see FIGS. 1 and 9). A short depression is detected by microcomputer 64 and initiates a clock-timed countdown, based upon the time established by the frequency of crystal clock control 70, counting down by minutes and seconds from the activation to a zero time representing the start time for rider 4. If, alternatively, rider 4 depresses and holds top button 26 for an extended period of time, the extended holding period is detected by microcomputer 64 and interpreted as an instruction to bypass the prestart countdown and to immediately start the race segment position display or mileage display.

The mileage display is designed to display continuously the miles, tenths, and hundredths of miles that the rider should be at each point in time during the running of the race course if the rider were perfectly holding to the speed which the rider has programmed in for each race segment. Thus the mileage display (FIG. 5) begins, at the beginning of the first race segment, at a zero value and increments on a time basis at the speed rate programmed in for the individual race segment. The rider may, by comparison of the mileage shown in the mileage display on display 30 with the mileage shown on odometer 12 (FIG. 3), determine instantly at any point during the race the extent to which the rider is ahead of or behind the position the rider should be at for a perfect, maximum score in the Enduro race.

The rider, as mentioned above, will only be scored at checkpoints; however, the rider does not know the exact location of any checkpoint and therefore does not know at what points during the race that best adherence to the should-be mileage should be achieved. The next checkpoint display (FIG. 6) is activated by the software to warn the rider of the imminence of a checkpoint. The location of any possible checkpoint along race course will be only those locations where the distance along a race segment is such that an integral tenth of a mile distance corresponds to a multiple of a whole minute of time from the initiation of the race. At the speeds at which an Enduro race is run, commonly under 50 miles an hour, there will be usually at least one possible checkpoint less than ten miles from any given point along the race course.

The pattern of possible checkpoints only at simultaneous occurrence of a tenth of a mile multiple and a whole minute multiple is preserved to the extent that the governing authority establishing a given race course will establish artificial mileage changes or "leaps" at the beginning of segments to manipulate the location of checkpoints to more geographically desirable locations. These mileage changes are known as resets and may be to any arbitrary mileage.

The computer program, as shown in Appendix I, calculates the occurrence of the next sequential tenth of a mile at which a possible checkpoint can occur, and then causes left alpha-numeric digit display 34 to flash (FIG. 6) with the tenth of a mile value at which the checkpoint may possibly occur; simultaneously the left center, right center and right alpha-numeric displays 36, 40, 42, show the should-be mileage for comparison with the possible next checkpoint.

This continuing pattern of should-be mileage and flashing next checkpoint display provide a unique and innovative display combination for guiding and statusing a rider in an Enduro race course environment.

Further flexibility is provided to and further aid is given to the rider by displaying a time countdown for all pauses between race segments where a wait should occur. This countdown, in reverse clock sequence, shows the minutes and seconds remaining until the next start in an overall race course. This display is valuable to a rider who is maintaining good progress and is monitoring his wait at a pause position; it is also invaluable to that rider who, being of lesser skill, is behind in the race, by indicating whether or not the latter rider will be able to close the distance before the start of the next race segment and thus gain a better score.

Thus in summary, in operation, apparatus 14 of the current invention, provides a unitized display device located along the line of sight 6 (FIG. 2) of a motorcylce rider 4 so that it may be viewed in conjunction with an odometer 12 (FIG. 3) to be found upon a motorcycle 2. The device provides the capability of programming in sequence the start timing, individual race segment mileage and speed, and individual pauses within an overall multi-segmented Enduro road race. When activated, the apparatus provides continuously throughout the race, clocked to the time of the start of the race, a display of an indication of the position in which the rider should be to attain maximum score. In combination with this display, the apparatus provides a unique display to alert the rider to those locations at which the rider should attempt to maximize the rider's accuracy in maintaining speed, distance and time so as to attain maximum score in entering and clocking through various checkpoints.

The apparatus of the current invention provides for a race that includes pauses and waits, that includes leaps or artificial changes in mileage, including artificial reduction of mileage through a race course to zero, known as resets.

It can thus be seen that the apparatus of the current invention provides a unique unitized display that provides an innovative information source to a motorcycle rider who is riding to the outer limits of the rider's individual capabilities. The apparatus makes minimum demands upon the operator's attention during actual riding; it permits pre-programming of all essential information. Once started, it provides a display which may be easily read and correlated with instruments readily available to the rider so that he may measure his progress, while diverting minimum attention from the more demanding task of operating a motorcycle to the rider's best capacity under circumstances that are intended and designed to test the rider's capability to the utmost.

It can thus be seen that the invention disclosed encompases, in addition to the particular preferred embodiment disclosed herein, those equivalents obvious to those skilled in the art, as emcompassed by the claims.

Appendix I

```
ISIS-II MCS-48/UPI-41 MACRO ASSEMBLER, V3.0
CMATE8.05       < 1-24-84>

LOC  OBJ         LINE        SOURCE STATEMENT 1
                   2
                   3
                   4
                   5
                   6
                   7
                   8
                   9
                  10
                  11  ;***********************************************************
                  12  ;*
                  13  ;*       INTERNAL PROGRAM RAM ALLOCATION :
                  14  ;*
                  15  ;*               (80C39 - 128 BYTES)
                  16  ;*
                  17  ;***********************************************************
                  18
 0000             19  REG     EQU     0               ;***   REGISTER BANK 0 ***
 0008             20  STACK   EQU     8               ;RESERVE 6 BYTES FOR STACK
 000E             21  TEMP    EQU     STACK+6         ;RESERVE 6 BYTES FOR TEMPORARY STORAGE
 0014             22  PSBL    EQU     TEMP+6          ;NEXT POSSIBLE MILE
 0016             23  PREMPH  EQU     PSBL+2          ;PRESENT MPH
 0017             24  FLGS    EQU     PREMPH+1        ;BIT 7 = FLASH FLAG
                  25                                  ;BIT 6 = 3 MILE INHIBIT FLAG
                  26                                  ;BIT 5 = POSSIBLE APROACH FLAG
                  27                                  ;BIT 4 = CHECK POINT FLAG
                  28                                  ;BIT 3 = PRESTART FLAG
                  29                                  ;BIT 2 = FLASH2 FLAG
                  30                                  ;BIT 1
                  31                                  ;BIT 0
 0018             32  XR      EQU     24              ;***   RISTER BANK 1   ***
 0023             33  USRRAM  EQU     35              ;BEGINING OF USER RAM
 0023             34  SWCNTS  EQU     USRRAM          ;THREE (1 BYTE) COUNTERS
 0026             35  PRGRAM  EQU     USRRAM+3        ;USER PROGRAM STORAGE
 0003             36  STAMPH  EQU     3H              ;STARTING MPH
 0082             37  ENDMPH  EQU     82H             ;ENDING MPH
                  38
                  39
                  40  ;***********************************************************
                  41  ;*
                  42  ;*     PERFORM POWER-UP/RESET SYSTEM INITIALIZATION :
                  43  ;*
                  44  ;*        NOTE: BOTH TIMER AND EXTERNAL INTERRUPTS ARE
                  45  ;*              DISABLED AUTOMATICALLY UPON "RESET".
                  46  ;*
                  47  ;***********************************************************
```

```
                    48
0000                49              ORG    0
                    50 PAGE0:
0000 15             51 RESET:  DIS    I              ;DISABLE EXTERNAL INTERRUPTS
0001 441D           52              JMP    INITZ     ;INITIALIZE SYSTEM
0003 15             53 EXTINT: DIS    I              ;DISABLE EXTERNAL INTERRUPTS
0004 00             54              NOP
0005 00             55              NOP
0006 93             56              RETR              ;NO INTERRUPT ACTIVE - EXIT
                    57 $EJECT
                    58 ;************************************************************
                    59 ;*
                    60 ;*      SERVICE TIMER INTERRUPT :
                    61 ;*
                    62 ;*      NOTES: TIMER INTERRUPTS OCCUR EVERY
                    63 ;*             50 msec.    [F = 2.4576 Mhz]
                    64 ;*                         [F = n] IN COMMENT =
                    65 ;*                         FREQUENCY DEPENDENT CONSTANT
                    66 ;*
                    67 ;*      COUNTER INTERRUPT SERVICE ROUTINE
                    68 ;*
                    69 ;*      R0 - POINTER
                    70 ;*      R1 - INTERRUPT COUNTER, RESET AT (1 SEC.)
                    71 ;*      R2 - SECOND COUNTER RESET AT 60H (BCD)
                    72 ;*      R3 - MIN. COUNTER RESET AT 99H (BCD)
                    73 ;*      R4 - MISC. COUNTER (USED TO INC. MILEAGE ON)
                    74 ;*      R5 - SWITCH FLAGS BIT7= COLON FLAG
                    75 ;*      R6 -
                    76 ;*      R7 - USED TO SAVE ACC. IN
                    77 ;*
                    78 ;************************************************************
0007                79              ORG    0007
0007 D5             80 CNTINT: SEL    RB1
0008 AF             81              MOV    R7,A           ;SAVE ACC.
0009 1C             82              INC    R4             ;MISC. COUNTERS
000A 19             83              INC    R1             ;INC INTERRUPT COUNTER
000B 2314           84              MOV    A,#20D         ;[F = 2.4576 Mhz]
000D D9             85              XRL    A,R1           ;1 SEC. ?
000E 9620           86              JNZ    CNTI1A         ;NO, BRANCH
0010 A9             87              MOV    R1,A
0011 FA             88              MOV    A,R2
0012 0301           89              ADD    A,#1
0014 57             90              DA     A              ;INC SECONDS
0015 AA             91              MOV    R2,A
0016 D360           92              XRL    A,#60H         ;SEC = 60
0018 9620           93              JNZ    CNTI1A         ;NO, BRANCH
001A AA             94              MOV    R2,A           ;CLEAR SEC. COUNTER
001B FB             95              MOV    A,R3
001C 0301           96              ADD    A,#1
001E 57             97              DA     A              ;INC MIN.
001F AB             98              MOV    R3,A
                    99
0020 B823           100 CNTI1A: MOV    R0,#SWCNTS     ;POINT TO SWITCH COUNTER #1
                    101                                ;SET UPPER PORTS HIGH
0022 89F0           102              ORL    P1,#0F0H       ;NEEDED FOR INTEL CPU
0024 09             103              IN     A,P1           ;READ SWITCHES BITS 6,7
0025 AE             104              MOV    R6,A
0026 E7             105              RL     A
0027 4E             106              ORL    A,R6           ;CLEAR BIT7 IF BOTH SWITCHES ON
0028 F7             107              RLC    A              ;MOV TO CARRY
0029 FE             108              MOV    A,R6           ;RESTORE SWITCH STATUS
002A F62D           109              JC     SW0            ;IF BOTH SWITCHES ON
002C 37             110              CPL    A              ;THEN SET BOTH SWITCH FLAGS TO SHOW OFF
002D 67             111 SW0:    RRC    A              ;BIT7 = 0 ONLY BOTH SWITCHES ON
002E AE             112              MOV    R6,A           ;BIT6 = 0 ONLY BOTTOM SWITCH IS ON
                    113                                ;BIT5 = 0 ONLY WHEN TOP SWITCH IS ON
                    114
002F D247           115 SW1:    JB6    SWOFF1         ;IF BOTTOM SWITCH = OFF THEN BRANCH
0031 FD             116              MOV    A,R5           ;GET SW FLAGS
0032 123B           117              JB0    ON1            ;IF BIT0(R5) = 1 THEN BRANCH
                    118                                ;SWITCH WAS ON AND BIT0 IS CLEAR
0034 4301           119              ORL    A,#00000001B   ;SET BIT0
0036 53FB           120              ANL    A,#11111011B   ;CLEAR BIT2
0038 AD             121              MOV    R5,A
0039 0455           122              JMP    SW1X
                    123
003B F0             124 ON1:    MOV    A,@R0          ;SWITCH IS ON, BIT IS SET
```

```
003C 0301    125            ADD    A,#1              ;INC. COUNTERS
003E F641    126            JC     ON1A              ;COUNTER = 255
0040 A0      127            MOV    @R0,A             ;SAVE NEW COUNT
0041 FD      128  ON1A:     MOV    A,R5              ;GET SW FLAGS
0042 4304    129            ORL    A,#00000100B      ;SET BIT 2 IN R5
0044 AD      130            MOV    R5,A
0045 0455    131            JMP    SW1X
             132
0047 FD      133  SWOFF1:   MOV    A,R5              ;SWITCH WAS OFF
0048 124C    134            JB0    OFF1              ;IF BIT0(R5) = 1 THEN BRANCH
004A 0450    135            JMP    OFF1A             ;SWITCH WAS OFF BIT0 IS CLEAR
004C 4302    136  OFF1:     ORL    A,#00000010B      ;SWITCH WAS OFF BIT0 IS SET
004E D308    137            XRL    A,#00001000B      ;SET BIT 1 AND CMP BIT 3
0050 53FA    138  OFF1A:    ANL    A,#11111010B      ;CLEAR BIT0 AND BIT3
0052 AD      139            MOV    R5,A
0053 B000    140            MOV    @R0,#0            ;CLEAR COUNTER
             141
0055 FE      142  SW1X:     MOV    A,R6              ;LOAD PORT STATUS
0056 18      143            INC    R0                ;POINT TO SWITCH COUNTER #2
             144                                     ;TEST TOP SWITCH (BYTE 5)
0057 B26F    145  SW2:      JB5    SWOFF2            ;IF SWITCH = OFF THEN BRANCH
0059 FD      146            MOV    A,R5              ;SAVE A
005A 9263    147            JB4    ON2               ;IF BIT4(R5) = 1 THEN BRANCH
             148                                     ;SWITCH WAS ON AND BIT4 IS CLEAR
005C 4310    149            ORL    A,#00010000B      ;SET BIT4
005E 53BF    150            ANL    A,#10111111B      ;CLEAR BIT6
0060 AD      151            MOV    R5,A
0061 047D    152            JMP    SW2X
             153
0063 F0      154  ON2:      MOV    A,@R0             ;SWITCH IS ON, BIT IS SET
0064 0301    155            ADD    A,#1              ;INC. COUNTERS
0066 F669    156            JC     ON2A              ;COUNTER = 255
0068 A0      157            MOV    @R0,A             ;SAVE NEW COUNT
0069 FD      158  ON2A:     MOV    A,R5              ;GET SW FLAGS
006A 4340    159            ORL    A,#01000000B      ;SET BIT 6 IN R5
006C AD      160            MOV    R5,A              ;SAVE SW FLAGS
006D 047D    161            JMP    SW2X
             162
006F FD      163  SWOFF2:   MOV    A,R5              ;SWITCH WAS OFF
0070 9274    164            JB4    OFF2              ;IF BIT4(R5) = 1 THEN BRANCH
0072 0478    165            JMP    OFF2A             ;SWITCH WAS OFF BIT4 IS CLEAR
0074 4320    166  OFF2:     ORL    A,#00100000B      ;SWITCH WAS OFF BIT4 IS SET
0076 D380    167            XRL    A,#10000000B      ;SET BIT 5 AND CMP BIT 7
0078 53AF    168  OFF2A:    ANL    A,#10101111B      ;CLEAR BIT4 AND BIT6
007A AD      169            MOV    R5,A
007B B000    170            MOV    @R0,#0            ;CLEAR COUNTER
             171
007D 18      172  SW2X:     INC    R0                ;POINT TO SWITCH COUNTER #3
007E FE      173            MOV    A,R6              ;LOAD PORT STATUS
             174                                     ;IF BOTH SWITCHES WERE NOT ON
007F F286    175            JB7    BOTH1             ;THEN BRANCH
             176
0081 F0      177            MOV    A,@R0             ;SWITCH IS ON, BIT IS SET
0082 0301    178            ADD    A,#1              ;INC. COUNTERS
0084 E687    179            JNC    BOTH2             ;IF COUNTER # 255 THEN BRANCH
0086 27      180  BOTH1:    CLR    A                 ;ELSE CLEAR COUNTER
0087 A0      181  BOTH2:    MOV    @R0,A             ;SAVE NEW COUNT
0088 B817    182            MOV    R0,#FLGS
008A F0      183            MOV    A,@R0             ;LOAD FLAGS
008B 537F    184            ANL    A,#01111111B      ;CLEAR FLASH FLAG
008D A0      185  CNTI2A:   MOV    @R0,A
008E 23F1    186            MOV    A,#0FFH-14
0090 69      187            ADD    A,R1
0091 F6A1    188            JC     CNTI02            ;DISPLAY OFF IF SEC. > .75
0093 23F6    189            MOV    A,#0FFH-9
0095 69      190            ADD    A,R1
0096 F0      191            MOV    A,@R0
0097 4304    192            ORL    A,#00000100B      ;SET FLASH2 FLAG
0099 A0      193            MOV    @R0,A
009A F6A5    194            JC     CNTI03            ;DISPLAY ON  IF SEC. > .50
009C 23FB    195            MOV    A,#0FFH-4
009E 69      196            ADD    A,R1
009F E6A5    197            JNC    CNTI03            ;DISPLAY ON IF SEC. <= .25
00A1 F0      198  CNTI02:   MOV    A,@R0
00A2 4380    199            ORL    A,#10000000B      ;SET FLASH FLAG
00A4 A0      200            MOV    @R0,A
             201
```

```
00A5 FF      202 CNTI03: MOV   A,R7           ;RESTORE ACC.
00A6 93      203         RETR
             204
             205 $EJECT
             206 ;****************************************************************
             207 ;*
             208 ;*          EXECUTION LOOP
             209 ;*
             210 ;*     R0      POINT TO MILEAGE OF NEXT SPEED CHANGE
             211 ;*     R1
             212 ;*     R2      CURRENT 100'TH MILE (BCD)
             213 ;*     R3      CURRENT WHOLE MILE (BCD)
             214 ;*     R4      RTC COUNT TO INC. MILEAGE ON
             215 ;*     R5      RTC FRACTION TO INC. MILEAGE ON
             216 ;*     R6
             217 ;*     R7
             218 ;*
             219 ;****************************************************************
             220
00A7 27      221 IEXEC:  CLR   A
00A8 B807    222         MOV   R0,#7
00AA A0      223 EXEC1:  MOV   @R0,A          ;CLEAR RAM FROM R7 THRU R0
00AB E8AA    224         DJNZ  R0,EXEC1
00AD B824    225         MOV   R0,#PRGRAM-2
             226
00AF B917    227         MOV   R1,#FLGS
00B1 F1      228         MOV   A,@R1
00B2 4348    229         ORL   A,#01001000B   ;SET PRESTART COUNTDOWN
00B4 A1      230         MOV   @R1,A          ; & 3 MILE INHIBIT FLAGS
             231
00B5 9490    232         CALL  SPEED1
             233
00B7 B917    234         MOV   R1,#FLGS
00B9 F1      235         MOV   A,@R1
00BA 53F7    236         ANL   A,#11110111B   ;CLEAR PRESTART FLAG
00BC A1      237         MOV   @R1,A
             238
00BD 27      239         CLR   A
00BE 35      240         DIS   TCNTI          ;DISABLE TIMER INTERRUPTS
00BF B918    241         MOV   R1,#XR
00C1 BE05    242         MOV   R6,#5
00C3 A1      243 EXEC2:  MOV   @R1,A          ;CLEAR TIMER RS. XR0 to XR4
00C4 19      244         INC   R1
00C5 EEC3    245         DJNZ  R6,EXEC2
00C7 62      246         MOV   T,A
00C8 25      247         EN    TCNTI          ;ENABLE TIMER INTERRUPTS
00C9 55      248         STRT  T
00CA F1      249         MOV   A,@R1          ;LOAD SWITCH FLAGS
00CB 92D1    250         JB4   EXEC4          ;IF TOP SWITCH HELD IN THEN BRANCH
00CD 537F    251         ANL   A,#01111111B   ;ELSE CLEAR POSSIBLE MODE FLAG
00CF 04D5    252         JMP   EXEC6
             253
00D1 F2D5    254 EXEC4:  JB7   EXEC6          ;IF TOP SWITCH IN BEING HELD IN
             255                              ;AND POSSIBLE MODE FLAG IS SET THEN
             256                              ;BRANCH
00D3 4380    257         ORL   A,#10000000B   ;ELSE SET POSSIBLR MODE FLAG SO THAT
             258                              ;IT WILL BE CLEARED WHEN IT IS RELEASED
00D5 53F7    259 EXEC6:  ANL   A,#11110111B   ;CLEAR TIMER MODE FLAG
00D7 A1      260         MOV   @R1,A
00D8 23BB    261         MOV   A,#0BBH        ;A = "EE"
00DA C8      262         DEC   R0
00DB D0      263         XRL   A,@R0          ;COMPARE
00DC 18      264         INC   R0
00DD C6E8    265         JZ    CKPNT          ;IF EQUAL "EE" THEN CHECK POINT CLOCK
00DF B914    266         MOV   R1,#PSBL       ;ELSE SET UP TEMP LOCATIONS
00E1 FA      267         MOV   A,R2           ;SET NEXT POSSIBLE EQUAL TO PRESENT
00E2 A1      268         MOV   @R1,A          ;MILE TO FORCE POSSIBLE UPDATE
00E3 19      269         INC   R1             ;POINT TO POSSIBLE WHOLE MILE
00E4 FB      270         MOV   A,R3           ;LOAD PRESENT WHOLE MILE
00E5 A1      271         MOV   @R1,A
00E6 A490    272         JMP   ENTRY          ;      AND START NORMAL EXECUTION
             273
00E8 B91A    274 CKPNT:  MOV   R1,#XR+2       ;POINT TO TIME
00EA 23F8    275         MOV   A,#11111000B   ;COLON ON
00EC 39      276         OUTL  P1,A
00ED F1      277         MOV   A,@R1          ;DISPLAY TIME
00EE D4A8    278         CALL  OUTLSB
00F0 19      279         INC   R1
```

```
00F1 F1            280            MOV    A,@R1
00F2 D4A4          281            CALL   OUTMSB
00F4 B925          282            MOV    R1,#SWCNTS+2      ;BOTH SWITCHES
00F6 239B          283            MOV    A,#0FFH-100       ;DEPRESSED
00F8 61            284            ADD    A,@R1             ;GREATER THAN 5 SEC.
00F9 E6E8          285            JNC    CKPNT             ;NO, BRANCH
00FB C45A          286            JMP    SLEEP             ;YES, BATTERY CHECK THEN SLEEP
                   287
00FC               288 PAGE0X     EQU    $-1
                   289 $EJECT
                   290
0100               291            ORG    100H
                   292 PAGE1:
0100 B003          293 MPH1:      MOV    @R0,#STAMPH       ;START OF MPH RANGE
0102 23F0          294            MOV    A,#11110000B
0104 39            295            OUTL   P1,A              ;CLEAR COLON & DEC. PTS.
0105 F0            296 MPH2:      MOV    A,@R0             ;DISPLAY MILES PER HOUR
0106 D4A8          297            CALL   OUTLSB            ;MPH DISPLAYED
0108 23FF          298            MOV    A,#0FFH
010A D4A4          299            CALL   OUTMSB            ;TWO BLANKS DISPLAYED
010C B91D          300 MPH3:      MOV    R1,#XR+5
010E F1            301            MOV    A,@R1
010F B24A          302            JB5    MILES             ;IF PROG. SW. (ON AND OFF)
0111 1217          303            JB0    MPH3A             ;IF PROG. SW. (HELD ON)
0113 3227          304            JB1    MPH4              ;IF RUN SW. (ON AND OFF)
0115 240C          305            JMP    MPH3              ;WAIT FOR A SWITCH
0117 B923          306 MPH3A:     MOV    R1,#SWCNTS
0119 23EB          307            MOV    A,#0FFH-20        ;[F = 2.4576 Mhz]
011B 61            308            ADD    A,@R1
011C E60C          309            JNC    MPH3              ;IF SWITCH NOT ON MORE THAN 1 SEC.
011E B91C          310            MOV    R1,#XR+4
0120 B100          311            MOV    @R1,#0            ;CLEAR TEMP COUNTER
0122 23FE          312 DLY0:      MOV    A,#0FFH-1         ;[F = 2.4576 Mhz]
0124 61            313            ADD    A,@R1
0125 E622          314            JNC    DLY0              ;DELAY .05 SEC
0127 53FD          315 MPH4:      ANL    A,#11111101B      ;CLEAR (ON AND OFF) FLAG
0129 A1            316            MOV    @R1,A
                   317
012A 23FD          318 MPH5:      MOV    A,#0FDH
012C D0            319            XRL    A,@R0
012D C640          320            JZ     MPH6              ;IF @R0=" L" THEN BRANCH
012F 23FE          321            MOV    A,#0FEH           ;ELSE
0131 D0            322            XRL    A,@R0
0132 C642          323            JZ     MPH7              ;IF @R0=" P" THEN BRANCH
0134 2382          324            MOV    A,#ENDMPH         ;ELSE
0136 D0            325            XRL    A,@R0
0137 C646          326            JZ     MPH8              ;IF @R0=END OF MPH RANGE THEN BRANCH
0139 2301          327            MOV    A,#1              ;ELSE
013B 60            328            ADD    A,@R0
013C 57            329            DA     A                 ;INC. (BCD) MILES PER HOUR
013D A0            330            MOV    @R0,A
013E 2405          331            JMP    MPH2              ;IF MPH < END OF MPH RANGE
0140 2400          332 MPH6:      JMP    MPH1              ;@R0=" L" SO REPEAT LOOP
                   333
0142 B0FD          334 MPH7:      MOV    @R0,#0FDH         ;@R0=" P" SO LET @R0=" L"
0144 2405          335            JMP    MPH2
                   336
0146 B0FE          337 MPH8:      MOV    @R0,#0FEH         ;@R0=ENDMPH SO LET @R0=" P"
0148 2405          338            JMP    MPH2
                   339
                   340 ;****************************************************
                   341 ;          MOV    A,#0FFH-123       ;IF THERE IS NOT ENOUGH ROOM
                   342 ;          ADD    A,R0              ;OR PAUSE AND ENDING MPH SETTING
                   343 ;          JC     MPH1              ;THEN DON'T ALLOW ANOTHER PAUSE
                   344 ;          MOV    @R0,#0FEH         ;ELSE @R0 = " P"ause
                   345 ;          JMP    MPH2
                   346 ;****************************************************
                   347
014A B91D          348 MILES:     MOV    R1,#XR+5
014C F1            349            MOV    A,@R1
014D 53DD          350            ANL    A,#11011101B      ;CLEAR O&F FLAG
014F A1            351            MOV    @R1,A
0150 85            352            CLR    F0
0151 F0            353            MOV    A,@R0
0152 AC            354            MOV    R4,A              ;SAVE " P" OR " L"
0153 D3FE          355            XRL    A,#0FEH           ;IF MPH = " P"
0155 C65C          356            JZ     MILE01            ;THEN BRANCH
                   357
```

```
0157 23FD      358            MOV      A,#0FDH
0159 DC        359            XRL      A,R4            ;IF MPH # " L"
015A 9679      360            JNZ      MILE0           ;THEN BRANCH
               361
               362
015C 2328      363 MILE01:    MOV      A,#PRGRAM+2     ;IF THIS IS NOT THE SECOND
015E D8        364            XRL      A,R0            ;    TWO BYTE ENTRY
015F 9677      365            JNZ      MILE30          ;THEN BRANCH (NOT CHECK CLOCK)
0161 23FE      366            MOV      A,#0FEH
0163 DC        367            XRL      A,R4            ;IF R4 # " P"
0164 9677      368            JNZ      MILE30          ;ELSE BRANCH
0166 B926      369            MOV      R1,#PRGRAM      ;ELSE POINT TO FIRST ENTRY
0168 230F      370            MOV      A,#0FH
016A 51        371            ANL      A,@R1
016B D30E      372            XRL      A,#0EH          ;IF IT'S A PAUSE
016D 9677      373            JNZ      MILE30          ;THEN NOT CHECK CLOCK, BRANCH
016F B917      374            MOV      R1,#FLGS
0171 F1        375            MOV      A,@R1
0172 4310      376            ORL      A,#00010000B    ;SET CHECKPOINT CLOCK FLAG
0174 A1        377            MOV      @R1,A
0175 24BB      378            JMP      ENDPRG
               379
0177 C8        380 MILE30:    DEC      R0
0178 95        381            CPL      F0              ;SET F0
0179 95        382 MILE0:     CPL      F0
017A 18        383            INC      R0              ;INC POINTER
017B 2384      384            MOV      A,#0FFH-123     ;IS THERE ENOUGH
017D 68        385            ADD      A,R0            ;RAM FOR MORE CHANGES
017E F6BB      386            JC       ENDPRG          ;NO, BRANCH
0180 23F2      387            MOV      A,#11110010B    ;SET DP.2
0182 39        388            OUTL     P1,A
0183 B69D      389            JF0      MILE1           ;IF NOT PAUSE OR LEAP THEN BRANCH
0185 FA        390            MOV      A,R2
0186 A0        391            MOV      @R0,A           ;SAVE LAST MILE ENTERED
0187 18        392            INC      R0
0188 FB        393            MOV      A,R3
0189 A0        394            MOV      @R0,A
018A C8        395            DEC      R0
018B 23FD      396            MOV      A,#0FDH
018D DC        397            XRL      A,R4            ;IF " L" THEN BRANCH
018E C699      398            JZ       MILE12
0190 BB00      399            MOV      R3,#0
0192 BA1E      400            MOV      R2,#1EH         ;R3/R2 = "001P"
0194 23F0      401            MOV      A,#0F0H         ;CLEAR COLON & DPS.
0196 39        402            OUTL     P1,A
0197 249D      403            JMP      MILE1
               404
0199 BB00      405 MILE12:    MOV      R3,#0           ;RESET MILES TO "00.0L"
019B BA0D      406            MOV      R2,#0DH
               407
019D FA        408 MILE1:     MOV      A,R2
019E D4A8      409            CALL     OUTLSB
01A0 FB        410            MOV      A,R3
01A1 D4A4      411            CALL     OUTMSB          ;MILES OF CHANGE DISPLAYED
01A3 B91D      412 MILE2:     MOV      R1,#XR+5
01A5 F1        413            MOV      A,@R1
01A6 92B0      414            JB4      MILE2A          ;PROG SW. ON
01A8 B2F7      415            JB5      STOMIL          ;PROG SW. ON&OFF
01AA 32D5      416            JB1      MILE4           ;IF RUN SW O&F
01AC 12C5      417            JB0      MILE3           ;IF RUN SW. ON
01AE 24A3      418            JMP      MILE2
01B0 B924      419 MILE2A:    MOV      R1,#SWCNTS+1    ;RUN SWITCH ON
01B2 23C3      420            MOV      A,#0FFH-60      ;[F]
01B4 61        421            ADD      A,@R1
01B5 E6A3      422            JNC      MILE2           ;IF RUN SWITCH ON <= 3 SEC. THEN BRANCH
01B7 B6BB      423            JF0      ENDPRG          ;IF NOT PAUSE MODE THEN BRANCH
01B9 24A3      424            JMP      MILE2           ;THEN DON'T ALLOW END ON PAUSE
01BB 95        425 ENDPRG:    CPL      F0
01BC 23BB      426            MOV      A,#0BBH         ;END OF PROGRAM MARK
01BE A0        427            MOV      @R0,A
01BF 18        428            INC      R0              ;NOTE:  FLAG1 SET
01C0 A0        429            MOV      @R0,A           ;       IF CHECK POINT CLOCK MODE
01C1 18        430            INC      R0
01C2 A0        431            MOV      @R0,A
01C3 C45A      432            JMP      SLEEP
01C5 B923      433 MILE3:     MOV      R1,#SWCNTS
01C7 23EB      434            MOV      A,#0FFH-20      ;[F = 2.4576 Mhz]
01C9 61        435            ADD      A,@R1
```

```
01CA E69D    436           JNC    MILE1         ;IF SWITCH NOT ON MORE THAN 1 SEC.
01CC B91C    437           MOV    R1,#XR+4
01CE B100    438           MOV    @R1,#0        ;CLEAR TEMP COUNTER
01D0 23FF    439 DLY1:     MOV    A,#100H-1     ;[F = 2.4576 Mhz]
01D2 61      440           ADD    A,@R1
01D3 E6D0    441           JNC    DLY1          ;DELAY .05 SEC
01D5 FA      442 MILE4:    MOV    A,R2
01D6 53F0    443           ANL    A,#0F0H
01D8 0310    444           ADD    A,#10H        ;INCREMENT MILE BY .1 MILE
01DA 57      445           DA     A             ;OR PAUSE BY 1 MIN.
01DB AA      446           MOV    R2,A
01DC B6EB    447           JF0    MILE48        ;IF NOT PAUSE OR LEAP THEN BRANCH
01DE 23FE    448           MOV    A,#0FEH
01E0 DC      449           XRL    A,R4          ;IF R4 = " P"
01E1 C6E7    450           JZ     MILE44        ;BRANCH
01E3 230D    451           MOV    A,#0DH
01E5 24E9    452           JMP    MILE46
01E7 230E    453 MILE44:   MOV    A,#0EH
01E9 4A      454 MILE46:   ORL    A,R2          ;ELSE FLAG WITH TRAILING "L" OR "P"
01EA AA      455           MOV    R2,A
01EB 27      456 MILE48:   CLR    A
01EC 7B      457           ADDC   A,R3
01ED 57      458           DA     A
01EE AB      459           MOV    R3,A          ;INC MILE IF CARRY
01EF B91D    460           MOV    R1,#XR+5
01F1 23DD    461           MOV    A,#11011101B
01F3 51      462           ANL    A,@R1
01F4 A1      463           MOV    @R1,A         ;CLEAR SWITCH ON&OFF FLAGS
01F5 249D    464           JMP    MILE1
01F7 B91D    465 STOMIL:   MOV    R1,#XR+5
01F9 23DD    466           MOV    A,#11011101B
01FB 51      467           ANL    A,@R1
01FC A1      468           MOV    @R1,A         ;CLEAR ON&OFF FLAGS
01FD FA      469           MOV    A,R2
01FE 20      470           XCH    A,@R0         ;STORE NEW MILE
01FF AD      471           MOV    R5,A          ;SAVE OLD MILE
01FF         472 PAGE1X    EQU    $-1                         ;JMP   PAGE2
             473 $EJECT
             474 PAGE2:                         ;ORG   200H
0200 B60D    475           JF0    STORE1        ;IF NOT PAUSE OR LEAP MODE THEN BRANCH
0202 23FE    476           MOV    A,#0FEH
0204 DC      477           XRL    A,R4          ;IF R4#" P"
0205 9609    478           JNZ    STORE0        ;THEN MUST BE " L" , BRANCH
0207 FD      479           MOV    A,R5          ;ELSE PAUSE MODE
0208 AA      480           MOV    R2,A          ;RESTORE OLD MILE
             481
0209 23F0    482 STORE0:   MOV    A,#0F0H       ;LEAP MODE
020B 5A      483           ANL    A,R2          ;MASK OUT
020C AA      484           MOV    R2,A          ;TRAILING "P" OR "L"
             485
020D 18      486 STORE1:   INC    R0
020E FB      487           MOV    A,R3
020F 20      488           XCH    A,@R0         ;STORE NEW MILE
0210 AD      489           MOV    R5,A          ;SAVE OLD MILE
0211 B61A    490           JF0    STORE2        ;IF NOT PAUSE MODE THEN BRANCH
0213 23FE    491           MOV    A,#0FEH
0215 DC      492           XRL    A,R4
0216 961A    493           JNZ    STORE2
0218 FD      494           MOV    A,R5
0219 AB      495           MOV    R3,A          ;RESTORE OLD MILE
             496
021A 18      497 STORE2:   INC    R0            ;MILE TO CHANGE AT STORED
021B 2400    498           JMP    MPH1
             499
             500 $EJECT
             501 ;****************************************************
             502 ;*
             503 ;*    INITIALIZE SYSTEM :
             504 ;*
             505 ;*        ENTRY CONDITION(S): NONE
             506 ;*        EXIT  CONDITION(S): NONE
             507 ;*
             508 ;****************************************************
             509
021D 27      510 INITZ:    CLR    A
021E B87F    511           MOV    R0,#127
0220 A0      512 CLRRAM:   MOV    @R0,A
0221 E820    513           DJNZ   R0,CLRRAM
```

```
0223 37        514           CPL     A
0224 39        515           OUTL    P1,A         ;DISPLAY "?.?.:?.?"
0225 3A        516           OUTL    P2,A
0226 55        517           STRT    T
0227 25        518           EN      TCNTI
0228 2388      519           MOV     A,#88H       ;DISPLAY "8.8.:?.?"
022A D4A4      520           CALL    OUTMSB       ;DISPLAY "8.8.:8.8"
022C D4A8      521           CALL    OUTLSB
022E B91C      522           MOV     R1,#XR+4
0230 23D7      523 INIT1:    MOV     A,#0FFH-40   ;[F]
0232 61        524           ADD     A,@R1
0233 E630      525           JNC     INIT1        ;DELAY 2 SEC.
0235 23FF      526           MOV     A,#0FFH
0237 D4A4      527           CALL    OUTMSB
0239 D4A8      528           CALL    OUTLSB       ;DISPLAY IS BLANK
023B 99F7      529           ANL     P1,#11110111B ;COLON OFF
023D B81C      530           MOV     R0,#XR+4
023F B000      531 INIT2:    MOV     @R0,#0
               532                                ;SET UPPER PORTS
0241 89F0      533           ORL     P1,#0F0H     ;NEEDED FOR INTEL CPU
0243 09        534           IN      A,P1         ;GET BATTERY STATUS
0244 B250      535           JB5     INIT3        ;BRANCH IF BATTERY OK
0246 23CB      536           MOV     A,#0CBH
0248 D4A4      537           CALL    OUTMSB       ;DISPLAY "HELP"
024A 23DE      538           MOV     A,#0DEH
024C D4A8      539           CALL    OUTLSB
024E 444E      540           JMP     $            ;LOCK UP IF BATTERY BAD
0250 863F      541 INIT3:    JNI     INIT2        ;WAIT FOR INTERRUPT SWITCH TO CLEAR
0252 23FA      542           MOV     A,#0FFH-5
0254 60        543           ADD     A,@R0
0255 E650      544           JNC     INIT3        ;THEN DELAY .25 SEC.
               545                                ;SET UPPER PORTS
0257 89F0      546           ORL     P1,#0F0H     ;NEEDED FOR INTEL CPU
0259 01        547 IDLE1:    DB      01           ;IDLE
               548                                ;SET UPPER PORTS
025A 89F0      549           ORL     P1,#0F0H     ;NEEDED FOR INTEL CPU
025C 8660      550           JNI     WAKE1        ;WAKE UP IF INT SWITCH DEPRESSED
025E 4459      551           JMP     IDLE1        ;CONT TO IDLE IF NO INT SWITCH
               552 ;NOTE TIMER INTERRUPT WILL BRING INTEL PROCCESOR OUT OF IDLE MODE
               553
0260 B91D      554 WAKE1:    MOV     R1,#XR+5
0262 B111      555           MOV     @R1,#00010001B ;SET SWITCH DEPRESSED STATUS
0264 F1        556 INIT4:    MOV     A,@R1
0265 47        557           SWAP    A
0266 41        558           ORL     A,@R1
0267 1264      559           JB0     INIT4        ;WAIT FOR BOTH SWITCHES TO CLEAR
0269 B100      560 INIT5:    MOV     @R1,#0
026B B817      561           MOV     R0,#FLGS
026D B000      562           MOV     @R0,#0       ;CLEAR ALL FLAGS
026F B826      563           MOV     R0,#PRGRAM
0271 2400      564           JMP     MPH1
0272           565 PAGE2X    EQU     $-1
               566
               567 $EJECT
0483           568           ORG     483H
0483 A3        569 MOVP4:    MOVP    A,@A
0484 83        570           RET
               571
0485 F0        572 SPEED:    MOV     A,@R0        ;100'TH MILE OF NEXT CHANGE
0486 DA        573           XRL     A,R2         ;IF IT NOT EQUAL TO PRESENT
0487 968F      574           JNZ     XSPEED       ;THEN BRANCH
0489 18        575           INC     R0           ;ELSE
048A F0        576           MOV     A,@R0        ;WHOLE MILE OF NEXT CHANGE
048B C8        577           DEC     R0
048C DB        578           XRL     A,R3         ;IF PRESENT MILE = MILE TO CHANGE SPEED
048D C690      579           JZ      SPEED1       ;THEN BRANCH
048F 83        580 XSPEED:   RET
               581                                ;UPDATE TO NEXT SPPED
0490 18        582 SPEED1:   INC     R0           ;POINTS TO OLD 100'TH MILE
0491 18        583           INC     R0           ;POINTS TO NEW SPEED
0492 230F      584           MOV     A,#0FH
0494 50        585           ANL     A,@R0
0495 D30E      586           XRL     A,#0EH       ;IF LOWER NIBBLE # "P"
0497 969B      587           JNZ     SP1          ;THEN BRANCH
0499 E400      588           JMP     PAUSE
049B 230F      589 SP1:      MOV     A,#0FH       ;ELSE
049D 50        590           ANL     A,@R0
049E D30D      591           XRL     A,#0DH       ;IF LOWER NIBBLE = "L"
```

```
04A0 C6A5        592           JZ      LEAP             ;THEN BRANCH
04A2 18          593           INC     R0
04A3 8485        594           JMP     SPEED            ;ELSE   CHECK TO SEE IF NEW SPEED
                 595
                 596 ;****************************************************************
                 597 ;*
                 598 ;*       ******* LEAP ROUTINE *******
                 599 ;*
                 600 ;*       ENTRY CONDITIONS
                 601 ;*               R0       POINTS TO LSB OF MILES TO LEAP TOO
                 602 ;*
                 603 ;*       EXIT CONDITIONS:
                 604 ;*               A        ALTERED
                 605 ;*               R0       RESTORED
                 606 ;*               R1       ALTERED
                 607 ;*               R2       NEW FRACTION OF MILE
                 608 ;*               R3       NEW WHOLE MILE
                 609 ;*               #FLGS    ALTERED IF R2=R3=0
                 610 ;*
                 611 ;****************************************************************
                 612
04A5 F0          613 LEAP:     MOV     A,@R0            ;LOAD TENTH OF MILE + "L"
04A6 53F0        614           ANL     A,#0F0H          ;MASK OUT THE "L"
04A8 AA          615           MOV     R2,A             ;STORE TENTH OF MILE + 0
04A9 18          616           INC     R0
04AA F0          617           MOV     A,@R0            ;LOAD WHOLE MILE
04AB AB          618           MOV     R3,A             ;STORE
04AC C8          619           DEC     R0
04AD FA          620           MOV     A,R2             ;IF MILEAGE
04AE 4B          621           ORL     A,R3             ;   NOT EQUAL
04AF 96B9        622           JNZ     LEAP2            ;THEN BRANCH
04B1 B917        623           MOV     R1,#FLGS         ;ELSE
04B3 F1          624           MOV     A,@R1
04B4 4340        625           ORL     A,#01000000B     ;SET 3MILE INHIBIT FLAG
04B6 53DF        626           ANL     A,#11011111B     ;CLEAR POSSIBLE FLAG
04B8 A1          627           MOV     @R1,A
04B9 8490        628 LEAP2:    JMP     SPEED1
                 629
04BA             630 PAGE4X    EQU     $-1
                 631 $EJECT
0500             632           ORG     500H
                 633 PAGE5:
                 634
                 635 EXLOOP:
                 636
                 637 ;****************************************************************
                 638 ;*
                 639 ;*       DISPLAY  (DIGITS NUMBERED 0,1,2,3 )
                 640 ;*
                 641 ;*       A        ALTERED
                 642 ;*       R1       ALTERED
                 643 ;*       R6       ALTERED
                 644 ;*       XR3      RESET TO 0 AT 60H
                 645 ;*
                 646 ;*       DISPLAYS
                 647 ;*       R3,R2            MILE.100'TH OR MIN/SEC IN PAUSE MODE
                 648 ;*       XR3,XR2  MIN:SEC IN TIME MODE
                 649 ;*       R6               SET COLON AND/OR DEC. POINTS
                 650 ;*
                 651 ;****************************************************************
                 652
0500 B91B        653 DSPLY:    MOV     R1,#XR+3
0502 2360        654           MOV     A,#60H
0504 D1          655           XRL     A,@R1
0505 9608        656           JNZ     DSPLY1
0507 A1          657           MOV     @R1,A            ;RESET MIN AT 60
0508 B91D        658 DSPLY1:   MOV     R1,#XR+5
050A F1          659           MOV     A,@R1            ;LOAD SWITCH FLAGS IN ACC.
050B 720F        660           JB3     DSPTIM           ;IF BIT3 SET DISPLAY TIME
050D A434        661           JMP     DSPLY4
                 662
050F B917        663 DSPTIM:   MOV     R1,#FLGS         ;#XR+5
0511 F1          664           MOV     A,@R1
0512 F228        665           JB7     DSPON            ;DISPLAY ON
0514 BEF0        666           MOV     R6,#11110000B    ;COLON OFF
0516 37          667           CPL     A
0517 B21B        668           JB5     DSPLY5           ;BRANCH IF NOT POSSIBLE
0519 BEF8        669           MOV     R6,#11111000B    ;ELSE DISPLAY COLON
```

```
051B FE        670 DSPLY5: MOV    A,R6
051C 39        671         OUTL   P1,A                    ;BLANK DISPLAY DIGITS
051D 97        672         CLR    C
051E 23CF      673         MOV    A,#11001111B            ;POINT TO DIGIT 0
0520 3A        674 D005:   OUTL   P2,A                    ;SELECT DIGIT
0521 3C        675         MOVD   P4,A                    ;OUTPUT BITS(0-3) "BLANK"
0522 0310      676         ADD    A,#00010000B            ;SELECT NEXT DIGIT
0524 E620      677         JNC    D005                    ;REPEAT 3 MORE TIMES
0526 A468      678         JMP    EX0010
               679
               680
0528 23F8      681 DSPON:  MOV    A,#11111000B            ;SET COLON ON
052A 39        682         OUTL   P1,A
052B B91A      683         MOV    R1,#XR+2
052D F1        684         MOV    A,@R1                   ;MOV    A,R5
052E D4A8      685         CALL   OUTLSB
0530 19        686         INC    R1
0531 F1        687         MOV    A,@R1
0532 A466      688         JMP    EX0009
               689
0534 BF02      690 DSPLY4: MOV    R7,#REG+2
0536 BEF2      691         MOV    R6,#11110010B           ;DP2 ON
0538 B917      692         MOV    R1,#FLGS                ;SEL    RB1
053A F1        693         MOV    A,@R1                   ;MOV    A,R5
053B 37        694         CPL    A                       ;IF BIT7=0
053C F242      695         JB7    DSPLY6                  ;THEN BRANCH
053E B242      696         JB5    DSPLY6                  ;IF NOT POSSIBLE BRANCH
0540 BEFA      697         MOV    R6,#11111010B           ;ELSE COLON & DP2 ON
0542 FE        698 DSPLY6: MOV    A,R6                    ;RESTORE A
0543 39        699         OUTL   P1,A
0544 FA        700         MOV    A,R2
0545 D4A8      701         CALL   OUTLSB
0547 FB        702         MOV    A,R3
0548 AE        703 EX0005: MOV    R6,A                    ;POINT TO SWITCH FLAGS
0549 B91D      704         MOV    R1,#XR+5                ;IF POSSIBLE MODE
054B F1        705         MOV    A,@R1                   ; IS NOT SELECTED
054C 37        706         CPL    A                       ;THEN BRANCH AND DISPLAY NORMALY
054D F265      707         JB7    EX0008                  ; MASK OUT UPPER NIBBLE
054F 230F      708         MOV    A,#0FH                  ; OF VALUE TO BE DISPLAYED
0551 5E        709         ANL    A,R6                    ; SAVE IN R6
0552 AE        710         MOV    R6,A
0553 B914      711         MOV    R1,#PSBL                ;LOAD 100TH OF NEXT POSSIBLE
0555 F1        712         MOV    A,@R1                   ; MASK OUT LOWER NIBBLE
0556 53F0      713         ANL    A,#0F0H                 ; OR WITH UPPER NIBBLE OF DISPLAY
0558 4E        714         ORL    A,R6                    ; AND SAVE IN R6
0559 AE        715         MOV    R6,A
055A B917      716         MOV    R1,#FLGS
055C F1        717         MOV    A,@R1
055D D261      718         JB6    EX0006                  ;POSSIBLES INHIBITED
055F F265      719 FLASH:  JB7    EX0008                  ;FLASH FLAG ON
0561 FE        720 EX0006: MOV    A,R6
0562 43F0      721         ORL    A,#0F0H                 ;BLANK UPPER NIBBLE
0564 AE        722         MOV    R6,A                    ;AND DISPLAY
0565 FE        723 EX0008: MOV    A,R6
0566 D4A4      724 EX0009: CALL   OUTMSB
0568 B925      725 EX0010: MOV    R1,#SWCNTS+2            ;BOTH SWITCHES
056A 239B      726         MOV    A,#0FFH-100             ;DEPRESSED
056C 61        727         ADD    A,@R1                   ;GREATER THAN 5 SEC.
056D E671      728         JNC    EX0020                  ;NO, BRANCH
056F C45A      729         JMP    SLEEP                   ;YES, BATTERY CHECK THEN SLEEP
               730
0571 B91C      731 EX0020: MOV    R1,#XR+4                ;IS IT PASS OR EQUAL TO
               732                                        ;THE TIME TO INC. MILEAGE
0573 F1        733         MOV    A,@R1                   ;RTC TO INC. MILEAGE ON
0574 37        734         CPL    A
0575 6C        735         ADD    A,R4
0576 F600      736         JC     EXLOOP                  ;*** NO, BRANCH ***
               737
               738 ;INC MILEAGE
0578 FA        739         MOV    A,R2                    ;INC. 100'TH MILE
0579 0301      740         ADD    A,#1
057B 57        741         DA     A
057C AA        742         MOV    R2,A
057D FB        743         MOV    A,R3                    ;ADD CARRY TO WHOLE MILE
057E 1300      744         ADDC   A,#0
0580 57        745         DA     A
0581 AB        746         MOV    R3,A
               747
```

```
                748 ;CHECK POSSIBLE STATUS
0582 B914       749         MOV     R1,#PSBL
0584 F1         750         MOV     A,@R1
0585 AE         751         MOV     R6,A            ;SAVE 100THS
0586 19         752         INC     R1
0587 F1         753         MOV     A,@R1           ;SAVE WHOLE MILES
0588 AF         754         MOV     R7,A            ;IF POSSIBLE WHOLE MILE
0589 DB         755         XRL     A,R3            ; NOT EQUAL TO
058A 9694       756         JNZ     POSS10          ; PRESENT WHOLE MILE, BRANCH
058C FE         757         MOV     A,R6            ;IF POSSIBLE 100TH MILE
058D DA         758         XRL     A,R2            ; NOT EQUAL TO
058E 9694       759         JNZ     POSS10          ; PRESENT 100TH MILE, BRANCH
                760
                761 ;SET FLAG
0590 85         762 ENTRY:  CLR     F0              ;PRESENT MILE = POSSIBLE MILE
0591 95         763         CPL     F0
0592 A4C0       764         JMP     WAIT
                765
                766
0594 FA         767 POSS10: MOV     A,R2            ;PRESENT MILE <> POSSIBLE MILE
0595 0315       768         ADD     A,#15H          ;ADD TO 100'TH MILE
0597 57         769         DA      A
0598 AE         770         MOV     R6,A
0599 27         771         CLR     A               ;ADD CARRY TO WHOLE MILE
059A 7B         772         ADDC    A,R3
059B 57         773         DA      A
059C AF         774         MOV     R7,A
                775
                776 ; IF R7(WHOLE MILE) >=3 THEN CLEAR IHIBIT FLAG
                777
059D 2397       778         MOV     A,#97H
059F 6F         779         ADD     A,R7
05A0 57         780         DA      A
05A1 E6AD       781         JNC     POSS18          ;PRESENT MILE + 00.15 >= 3.00
05A3 B917       782         MOV     R1,#FLGS        ;LOAD FLAGS
05A5 F1         783         MOV     A,@R1           ;IF 3 MILE FLAG AREADY CLEAR
05A6 37         784         CPL     A               ;THEN BRANCH
05A7 D2AD       785         JB6     POSS18          ;ELSE
05A9 37         786         CPL     A
05AA 53BF       787         ANL     A,#10111111B    ;CLEAR 3 MILE INHIBIT FLAG
05AC A1         788         MOV     @R1,A
                789
05AD B915       790 POSS18: MOV     R1,#PSBL+1
05AF F1         791         MOV     A,@R1
05B0 DF         792         XRL     A,R7            ;TEST WHOLE MILE
05B1 96C0       793         JNZ     WAIT            ;PRESENT MILE + 00.15 <> POSSIBLE MILE
05B3 C9         794         DEC     R1
05B4 F1         795         MOV     A,@R1
05B5 DE         796         XRL     A,R6            ;TEST 100TH MILE
05B6 96C0       797         JNZ     WAIT
05B8 B917       798         MOV     R1,#FLGS        ;PRESENT MILE + 00.15 = POSSIBLE MILE
05BA F1         799         MOV     A,@R1           ;LOAD FLAGS
05BB D2C0       800         JB6     WAIT            ;IF 3 MILE INHIBIT THEN BRANCH
05BD 4320       801         ORL     A,#00100000B    ;SET POSSIBLE FLAG (POSSIBLE APROACHING)
05BF A1         802         MOV     @R1,A
                803
05C0 42         804 WAIT:   MOV     A,T
05C1 F2C0       805         JB7     WAIT
05C3 FC         806         MOV     A,R4            ;YOU HAVE .025 SEC.
05C4 37         807         CPL     A               ;BEFORE NEXT INTER.
05C5 0301       808         ADD     A,#1
05C7 D5         809         SEL     RB1
05C8 6C         810         ADD     A,R4
05C9 AC         811         MOV     R4,A            ;XREG4 - REG4 ---> XREG4
05CA C5         812         SEL     RB0
05CB 9485       813         CALL    SPEED
05CD C8         814 EX0030: DEC     R0              ;POINT TO SPEED
05CE F0         815         MOV     A,@R0
05CF 18         816         INC     R0
05D0 97         817         CLR     C
05D1 F7         818         RLC     A               ;A * 2
05D2 AC         819         MOV     R4,A
05D3 E3         820         MOVP3   A,@A            ;LOOK-UP RTC COUNT
05D4 2C         821         XCH     A,R4            ;AND STORE IN R4
05D5 17         822         INC     A
05D6 E3         823         MOVP3   A,@A            ;LOAD RTC FRACTION
05D7 6D         824         ADD     A,R5            ;ADD TO R5
05D8 AD         825         MOV     R5,A
```

```
05D9 27        826            CLR   A                        ;ADD CARRY TO RTC COUNTER
05DA 2C        827            XCH   A,R4
05DB 7C        828            ADDC  A,R4
05DC 2C        829            XCH   A,R4
               830
               831
               832
05DD B6E1      833            JF0   POSS19
05DF A400      834            JMP   EXLOOP
05E1 85        835 POSS19:    CLR   F0                       ;CLEAR FLAG
05E2 C8        836            DEC   R0                       ;PRESENT MILE WAS EQUAL POSSIBLE MILE
05E3 F0        837            MOV   A,@R0                    ;LOAD PRESENT MPH
05E4 18        838            INC   R0
05E5 9483      839            CALL  MOVP4                    ;LOAD POSSIBLE INCREMENTS
05E7 47        840            SWAP  A
05E8 AE        841            MOV   R6,A
05E9 53F0      842            ANL   A,#0F0H
05EB 2E        843            XCH   A,R6                     ;R6 = 100THS
05EC 530F      844            ANL   A,#00FH
05EE AF        845            MOV   R7,A                     ;R7 = WHOLE MILES
               846
05EF FA        847            MOV   A,R2                     ;ADD TO 100'TH MILE
05F0 6E        848            ADD   A,R6
05F1 57        849            DA    A
05F2 AE        850            MOV   R6,A
05F3 FB        851            MOV   A,R3                     ;ADD CARRY TO WHOLE MILE
05F4 7F        852            ADDC  A,R7
05F5 57        853            DA    A
05F6 AF        854            MOV   R7,A
05F6           855 PAGE5X     EQU   $-1
               856
05F7 B915      857 PAGE6:     MOV   R1,#PSBL+1
05F9 A1        858            MOV   @R1,A
05FA FE        859            MOV   A,R6
05FB C9        860            DEC   R1
05FC A1        861            MOV   @R1,A                    ;NEXT POSSIBLE MILE RS UPDATED
               862
05FD B917      863            MOV   R1,#FLGS                 ;PRESENT MILE = POSSIBLE MILE
05FF F1        864            MOV   A,@R1                    ;LOAD FLAGS
0600 53DF      865            ANL   A,#11011111B             ;CLEAR POSSIBLE FLAG
0602 A1        866            MOV   @R1,A                    ; (POSSIBLE NOT APROACHING)
               867
0603 A400      868 POSS20:    JMP   EXLOOP
               869
               870 $EJECT
0605 23FF      871 CHECK:     MOV   A,#0FFH
0607 D4A8      872            CALL  OUTLSB
0609 D4A4      873            CALL  OUTMSB                   ;BLANK DISPLAY
060B F0        874 CHECKA:    MOV   A,@R0
060C C614      875            JZ    CHECKB                   ;IF TOP SWITCH RELEASED THEN BRANCH
060E 0337      876            ADD   A,#0FFH-200              ;IF TOP SWITCH ON < 10 SEC.
0610 E60B      877            JNC   CHECKA                   ;THEN BRANCH
0612 0400      878            JMP   RESET
0614 B100      879 CHECKB:    MOV   @R1,#0                   ;CLEAR SWITCH FLAGS
0616 C9        880            DEC   R1
0617 B826      881            MOV   R0,#PRGRAM
0619 23F0      882 CHK10:     MOV   A,#11110000B             ;CLEAR COLON, DP.'s
061B 39        883            OUTL  P1,A
               884
061C F0        885            MOV   A,@R0                    ;NEXT ENTRY
061D 530F      886            ANL   A,#0FH
061F D30E      887            XRL   A,#0EH                   ;IF LOWER NIBBLE OF A = "P"
0621 C641      888            JZ    CHK20                    ;THEN BRANCH
               889
0623 F0        890            MOV   A,@R0                    ;NEXT ENTRY
0624 530F      891            ANL   A,#0FH
0626 D30D      892            XRL   A,#0DH                   ;IF LOWER NIBBLE OF A = "L"
0628 C63E      893            JZ    CHK12                    ;THEN BRANCH
               894
062A F0        895            MOV   A,@R0                    ;ELSE DISPLAY MPH
062B D4A8      896            CALL  OUTLSB
062D 23FF      897            MOV   A,#0FFH                  ;DISPLAY TWO BLANKS
062F D4A4      898            CALL  OUTMSB
               899
0631 B100      900            MOV   @R1,#0                   ;POINTS TO XR4
0633 19        901 DLY2:      INC   R1
0634 F1        902            MOV   A,@R1
0635 92A2      903            JB4   JEXEC                    ;JMP TO EXECUTE
```

```
0637 C9        904           DEC     R1
0638 23D7      905           MOV     A,#0FFH-40        ;[F]
063A 61        906           ADD     A,aR1
063B E633      907           JNC     DLY2              ;DELAY 2 SEC.
063D 18        908           INC     R0
               909
063E 23F2      910  CHK12:   MOV     A,#11110010B      ;DP.2 ON
0640 39        911           OUTL    P1,A
0641 F0        912  CHK20:   MOV     A,aR0             ;DISPLAY MILE TO CHANGE
0642 D4A8      913           CALL    OUTLSB            ;FROM PREVIOUS MPH
0644 18        914           INC     R0
0645 F0        915           MOV     A,aR0
0646 D4A4      916           CALL    OUTMSB
               917
0648 B100      918           MOV     aR1,#0            ;ALREADY POINTS TO XR4
064A 19        919  DLY3:    INC     R1
064B F1        920           MOV     A,aR1
064C 92A2      921           JB4     JEXEC             ;JMP TO EXECUTE
064E C9        922           DEC     R1
064F 23D7      923           MOV     A,#0FFH-40        ;[F]
0651 61        924           ADD     A,aR1
0652 E64A      925           JNC     DLY3              ;DELAY 2 SEC.
               926
0654 23BB      927           MOV     A,#0BBH
0656 D0        928           XRL     A,aR0
0657 18        929           INC     R0
0658 9619      930           JNZ     CHK10             ;IF NOT END OF PROGRAM BRANCH
               931
065A C7        932  SLEEP:   MOV     A,PSW
065B 53F8      933           ANL     A,#11111000B      ;INIT STACK POINTER
065D D7        934           MOV     PSW,A             ;TO 0
065E 23F0      935           MOV     A,#11110000B
0660 39        936           OUTL    P1,A              ;COLON & DP. OFF
0661 09        937           IN      A,P1              ;GET BATTERY STATUS
0662 B275      938           JB5     SLEEP1            ;BRANCH IF BATTERY OK
0664 23CB      939           MOV     A,#0CBH
0666 D4A4      940           CALL    OUTMSB            ;DISPLAY "HELP"
0668 23DE      941           MOV     A,#0DEH
066A D4A8      942           CALL    OUTLSB
066C B91C      943           MOV     R1,#XR+4
066E B100      944           MOV     aR1,#0
0670 239B      945  SLEEP0:  MOV     A,#0FFH-100       ;[F]
0672 61        946           ADD     A,aR1
0673 E670      947           JNC     SLEEP0            ;DELAY 5 SEC.
0675 23AA      948  SLEEP1:  MOV     A,#0AAH
0677 D4A8      949           CALL    OUTLSB
0679 D4A4      950           CALL    OUTMSB            ;DISPLAY FOUR DASHES
067B 89F0      951  SLEEP2:  ORL     P1,#0F0H          ;NEEDED FOR INTEL CPU
067D 867B      952           JNI     SLEEP2            ;WAIT FOR TOP/INT SWITCH TO BE RELEASED
067F B91C      953           MOV     R1,#XR+4
0681 B100      954           MOV     aR1,#0
0683 23F5      955  SLEEP3:  MOV     A,#0FFH-10        ;[F]
0685 61        956           ADD     A,aR1
0686 E683      957           JNC     SLEEP3            ;DELAY 0.5 SEC.
                                                       ;SET UPPER PORTS
0688 89F0      959           ORL     P1,#0F0H          ;NEEDED FOR INTEL CPU
068A 01        960  IDLE2:   DB      01                ;IDLE
                                                       ;SET UPPER PORTS
068B 89F0      962           ORL     P1,#0F0H          ;NEEDED FOR INTEL CPU
068D 8691      963           JNI     WAKE2             ;WAKE UP IF INT SWITCH DEPRESSED
068F C48A      964           JMP     IDLE2             ;CONT TO IDLE IF NO INT SWITCH
               965  ;NOTE TIMER INTERRUPT WILL BRING INTEL PROCCESOR OUT OF IDLE MODE
               966
0691 B91D      967  WAKE2:   MOV     R1,#XR+5
0693 B824      968           MOV     R0,#SWCNTS+1
0695 B110      969           MOV     aR1,#00010000B    ;SET TOP SWITCH ON FLAG
0697 F1        970  SLEEP4:  MOV     A,aR1
0698 37        971           CPL     A                 ;IF TOP SWITCH OFF
0699 92A2      972           JB4     JEXEC             ;THEN BRANCH
069B 23D7      973           MOV     A,#0FFH-40        ;ELSE   IF TOP SWITCH HAS BEEN
069D 60        974           ADD     A,aR0             ;          HELD IN < 2 SEC.
069E E697      975           JNC     SLEEP4            ;          THEN LOOP
06A0 C405      976           JMP     CHECK
06A2 04A7      977  JEXEC:   JMP     IEXEC             ;START EXECUTION
               978  $EJECT
               979  ;************************************************************
               980  ;*
               981  ;*              OUTPUT DIGIT TO DISPLAY
```

```
           982 ;*
           983 ;*       ENTRY CONDITION:
           984 ;*              A - TWO DIGIT BCD NUMBER TO OUTPUT
           985 ;*
           986 ;*       EXIT CONDITION:
           987 ;*              R6 - ALTERED
           988 ;*
           989 ;****************************************************************
           990 ;
06A4 BECF  991 OUTMSB: MOV    R6,#11001111B    ;SETUP FOR DIGITS 0 & 1
06A6 C4AA  992         JMP    OUTD
06A8 BEEF  993 OUTLSB: MOV    R6,#11101111B    ;SETUP FOR DIGITS 2 & 3
06AA 47    994 OUTD:   SWAP   A
06AB 2E    995         XCH    A,R6             ;SAVE A
06AC 3A    996         OUTL   P2,A             ;OUTL R6 SELECT DIGIT
06AD 2E    997         XCH    A,R6             ;RESTORE A
06AE 3C    998         MOVD   P4,A             ;OUTPUT UPPER NIBBLE
06AF 47    999         SWAP   A
06B0 1E   1000         INC    R6
06B1 2E   1001         XCH    A,R6             ;SAVE A
06B2 3A   1002         OUTL   P2,A             ;SELECT DIGIT
06B3 2E   1003         XCH    A,R6             ;RESTORE A
06B4 3C   1004         MOVD   P4,A             ;OUTPUT LOWER NIBBLE
06B5 83   1005         RET
          1006
          1007 ;****************************************************************
          1008 ;*
          1009 ;*       DECBCD    DECREMENT A IN BCD
          1010 ;*
          1011 ;*       R6      ALTERED
          1012 ;*       A       RESULT
          1013 ;*
          1014 ;****************************************************************
          1015
06B6 0366 1016 DECBCD: ADD    A,#66H           ;Nine's complement
06B8 37   1017         CPL    A
06B9 0301 1018         ADD    A,#1             ;add
06BB 57   1019         DA     A
06BC F6C2 1020         JC     DEC1X
06BE 0366 1021         ADD    A,#66H           ;Nine's complement
          1022                                 ;Should always cear carry
06C0 37   1023         CPL    A
06C1 83   1024         RET                     ;Retrun with CARRY CLEAR
          1025
06C2 0366 1026 DEC1X:  ADD    A,#66H           ;Nine's complement
          1027                                 ;Should always cear carry
06C4 37   1028         CPL    A
06C5 A7   1029         CPL    C
06C6 83   1030         RET                     ;Return with CARRY SET for BORROW
06C6      1031 PAGE6X  EQU    $-1
          1032 $EJECT
0700      1033         ORG    700H
          1034 PAGE7:
          1035 ;****************************************************************
          1036 ;*
          1037 ;*       ******* PAUSE ROUTINE *******
          1038 ;*
          1039 ;*       ENTRY CONDITIONS
          1040 ;*              R0      POINTS TO LSB OF MIN. TO PAUSE
          1041 ;*
          1042 ;*       EXIT CONDITIONS:
          1043 ;*              A       ALTERED
          1044 ;*              R0      RESTORED
          1045 ;*              R2-R5   RESTORED
          1046 ;*              XR4     RESTORED
          1047 ;*              T       RESTORED
          1048 ;*              R1      ALTERED
          1049 ;*              R6      ALTERED
          1050 ;*              R7      ALTERED
          1051 ;*
          1052 ;****************************************************************
          1053
0700 F8   1054 PAUSE:  MOV    A,R0
0701 AF   1055         MOV    R7,A             ;SAVE R0
0702 B802 1056         MOV    R0,#2
0704 B90E 1057         MOV    R1,#TEMP
0706 BE04 1058         MOV    R6,#4
0708 F0   1059 PAUSE1: MOV    A,@R0
```

| | | | | | |
|---|---|---|---|---|---|
| 0709 A1 | 1060 | | MOV | @R1,A | |
| 070A 18 | 1061 | | INC | R0 | |
| 070B 19 | 1062 | | INC | R1 | |
| 070C EE08 | 1063 | | DJNZ | R6,PAUSE1 | ;SAVE R2-R5 |
| 070E 42 | 1064 | | MOV | A,T | |
| 070F A1 | 1065 | | MOV | @R1,A | ;SAVE TIMER COUNTER |
| 0710 19 | 1066 | | INC | R1 | |
| 0711 B81C | 1067 | | MOV | R0,#XR+4 | |
| 0713 F0 | 1068 | | MOV | A,@R0 | |
| 0714 A1 | 1069 | | MOV | @R1,A | ;SAVE XR4 |
| 0715 FF | 1070 | | MOV | A,R7 | |
| 0716 A8 | 1071 | | MOV | R0,A | ;RESTORE R0 |
| | 1072 | | | | |
| 0717 F0 | 1073 | | MOV | A,@R0 | ;GET LSB OF PAUSE TIME |
| 0718 47 | 1074 | | SWAP | A | |
| 0719 530F | 1075 | | ANL | A,#00FH | ;SHIFT AND REMOVE TRAILING "P" |
| 071B AB | 1076 | | MOV | R3,A | |
| 071C 18 | 1077 | | INC | R0 | |
| 071D F0 | 1078 | | MOV | A,@R0 | ;GET MSB |
| 071E 47 | 1079 | | SWAP | A | |
| 071F AC | 1080 | | MOV | R4,A | |
| 0720 53F0 | 1081 | | ANL | A,#0F0H | |
| 0722 4B | 1082 | | ORL | A,R3 | |
| 0723 AB | 1083 | | MOV | R3,A | |
| 0724 230F | 1084 | | MOV | A,#00FH | ;SHIFT AND ADD MIDDLE NIBBLE TO R2 |
| 0726 5C | 1085 | | ANL | A,R4 | |
| 0727 AC | 1086 | | MOV | R4,A | |
| 0728 B81A | 1087 | | MOV | R0,#XR+2 | |
| 072A F0 | 1088 | | MOV | A,@R0 | |
| 072B AD | 1089 | | MOV | R5,A | ;SAVE SEC. |
| 072C BA00 | 1090 | | MOV | R2,#0 | |
| | 1091 | | | | |
| 072E B917 | 1092 | PAUSE2: | MOV | R1,#FLGS | |
| 0730 F1 | 1093 | | MOV | A,@R1 | ;IF CHECK POINT CLOCK |
| 0731 927C | 1094 | | JB4 | PAUS00 | ;THEN BRANCH |
| 0733 37 | 1095 | | CPL | A | ;IF NOT PRESTART COUNTDOWN |
| 0734 727C | 1096 | | JB3 | PAUS00 | ;THEN BRANCH |
| 0736 B924 | 1097 | | MOV | R1,#SWCNTS+1 | ;POINT TO TOP SWITCH COUNTER |
| 0738 23D7 | 1098 | | MOV | A,#0FFH-40 | ;IF COUNT |
| 073A 61 | 1099 | | ADD | A,@R1 | ;      LESS THAN 2 SECONDS |
| 073B E67C | 1100 | | JNC | PAUS00 | ;THEN BRANCH |
| | 1101 | | | | |
| 073D 23F0 | 1102 | | MOV | A,#11110000B | ;BLANK DISPLAY |
| 073F 39 | 1103 | | OUTL | P1,A | |
| 0740 97 | 1104 | | CLR | C | |
| 0741 23CF | 1105 | | MOV | A,#11001111B | ;POINT TO DIGIT 0 |
| 0743 3A | 1106 | P005: | OUTL | P2,A | ;SELECT DIGIT |
| 0744 3C | 1107 | | MOVD | P4,A | ;OUTPUT BITS(0-3) "BLANK" |
| 0745 0310 | 1108 | | ADD | A,#00010000B | ;SELECT NEXT DIGIT |
| 0747 E643 | 1109 | | JNC | P005 | ;REPEAT 3 MORE TIMES |
| | 1110 | | | | |
| 0749 F1 | 1111 | P008: | MOV | A,@R1 | ;STILL POINTS TO TOP SWITCH COUNTER |
| 074A 9649 | 1112 | | JNZ | P008 | ;WAIT FOR SWITCH TO BE RELEASED |
| | 1113 | | | | |
| 074C B917 | 1114 | P010: | MOV | R1,#FLGS | |
| 074E F1 | 1115 | | MOV | A,@R1 | ;A = FLAGS |
| 074F F25F | 1116 | | JB7 | P01102 | ;DISPLAY ON |
| 0751 23F0 | 1117 | | MOV | A,#11110000B | ;COLON OFF |
| 0753 39 | 1118 | | OUTL | P1,A | |
| 0754 97 | 1119 | | CLR | C | ;BLANK DISPLAY |
| 0755 23CF | 1120 | | MOV | A,#11001111B | ;POINT TO DIGIT 0 |
| 0757 3A | 1121 | P01015: | OUTL | P2,A | ;SELECT DIGIT |
| 0758 3C | 1122 | | MOVD | P4,A | ;OUTPUT BITS(0-3) "BLANK" |
| 0759 0310 | 1123 | | ADD | A,#00010000B | ;SELECT NEXT DIGIT |
| 075B E657 | 1124 | | JNC | P01015 | ;REPEAT 3 MORE TIMES |
| 075D E46B | 1125 | | JMP | P020 | |
| | 1126 | | | | |
| 075F 23F2 | 1127 | P01102: | MOV | A,#11110010B | ;DP.2 ON |
| 0761 39 | 1128 | | OUTL | P1,A | |
| 0762 97 | 1129 | | CLR | C | ;"0" DISPLAY |
| 0763 23C0 | 1130 | | MOV | A,#11000000B | ;POINT TO DIGIT 0 |
| 0765 3A | 1131 | P01115: | OUTL | P2,A | ;SELECT DIGIT |
| 0766 3C | 1132 | | MOVD | P4,A | ;OUTPUT BITS(0-3) "0" |
| 0767 0310 | 1133 | | ADD | A,#00010000B | ;SELECT NEXT DIGIT |
| 0769 E665 | 1134 | | JNC | P01115 | ;REPEAT 3 MORE TIMES |
| | 1135 | | | | |
| 076B C5 | 1136 | P020: | SEL | RB0 | ;*** SELECT R. BANK 0 *** |
| 076C B925 | 1137 | | MOV | R1,#SWCNTS+2 | ;BOTH SWITCHES |

```
076E 239B    1138            MOV     A,#0FFH-100     ;DEPRESSED
0770 61      1139            ADD     A,@R1           ;GREATER THAN 5 SEC.
0771 E675    1140            JNC     P010XX          ;NO, BRANCH
0773 C45A    1141            JMP     SLEEP           ;YES, BATTERY CHECK THEN SLEEP
             1142
             1143 P010XX:
0775 B91D    1143            MOV     R1,#XR+5        ;POINT TO SWITCH FLAGS
0777 F1      1144            MOV     A,@R1           ;IF TOP SWITCH DEPRESSED
0778 92DD    1145            JB4     PAUSE8          ;THEN BRANCH
077A E44C    1146            JMP     P010            ;ELSE LOOP
             1147
             1148 $EJECT
077C B91B    1149 PAUS00:    MOV     R1,#XR+3
077E 2360    1150            MOV     A,#60H
0780 D1      1151            XRL     A,@R1           ;IF XR3#60
0781 9684    1152            JNZ     PAUS01          ;THEN BRANCH ELSE
0783 A1      1153            MOV     @R1,A           ;RESET MIN AT 60
0784 B917    1154 PAUS01:    MOV     R1,#FLGS
0786 F1      1155            MOV     A,@R1           ;A = XR5
0787 F297    1156            JB7     PAUS02          ;DISPLAY ON
0789 23F0    1157            MOV     A,#11110000B    ;COLON OFF
078B 39      1158 PAUS05:    OUTL    P1,A
078C 97      1159            CLR     C               ;BLANK DISPLAY
078D 23CF    1160            MOV     A,#11001111B    ;POINT TO DIGIT 0
078F 3A      1161 PAUS15:    OUTL    P2,A            ;SELECT DIGIT
0790 3C      1162            MOVD    P4,A            ;OUTPUT BITS(0-3) "BLANK"
0791 0310    1163            ADD     A,#00010000B    ;SELECT NEXT DIGIT
0793 E68F    1164            JNC     PAUS15          ;REPEAT 3 MORE TIMES
0795 E4B6    1165            JMP     PAUSX
             1166
0797 23F8    1167 PAUS02:    MOV     A,#11111000B    ;SET COLON ON
0799 39      1168            OUTL    P1,A
079A FA      1169            MOV     A,R2
             1170
             1171 ;OUTLSB----------------------------------------------------
079B BEEF    1172            MOV     R6,#11101111B   ;SETUP FOR DIGITS 2 & 3
079D 47      1173            SWAP    A
079E 2E      1174            XCH     A,R6            ;SAVE A
079F 3A      1175            OUTL    P2,A            ;OUTL R6 SELECT DIGIT
07A0 2E      1176            XCH     A,R6            ;RESTORE A
07A1 3C      1177            MOVD    P4,A            ;OUTPUT UPPER NIBBLE
07A2 47      1178            SWAP    A
07A3 1E      1179            INC     R6
07A4 2E      1180            XCH     A,R6            ;SAVE A
07A5 3A      1181            OUTL    P2,A            ;SELECT DIGIT
07A6 2E      1182            XCH     A,R6            ;RESTORE A
07A7 3C      1183            MOVD    P4,A            ;OUTPUT LOWER NIBBLE
             1184 ;----------------------------------------------------------
             1185
07A8 FB      1186            MOV     A,R3
             1187
             1188 ;OUTMSB----------------------------------------------------
07A9 BECF    1189            MOV     R6,#11001111B   ;SETUP FOR DIGITS 0 & 1
07AB 47      1190            SWAP    A
07AC 2E      1191            XCH     A,R6            ;SAVE A
07AD 3A      1192            OUTL    P2,A            ;OUTL R6 SELECT DIGIT
07AE 2E      1193            XCH     A,R6            ;RESTORE A
07AF 3C      1194            MOVD    P4,A            ;OUTPUT UPPER NIBBLE
07B0 47      1195            SWAP    A
07B1 1E      1196            INC     R6
07B2 2E      1197            XCH     A,R6            ;SAVE A
07B3 3A      1198            OUTL    P2,A            ;SELECT DIGIT
07B4 2E      1199            XCH     A,R6            ;RESTORE A
07B5 3C      1200            MOVD    P4,A            ;OUTPUT LOWER NIBBLE
             1201 ;----------------------------------------------------------
             1202
07B6 B925    1203 PAUSX:     MOV     R1,#SWCNTS+2    ;BOTH SWITCHES
07B8 239B    1204            MOV     A,#0FFH-100     ;DEPRESSED
07BA 61      1205            ADD     A,@R1           ;GREATER THAN 5 SEC.
07BB E6BF    1206            JNC     PAUSXX          ;NO, BRANCH
07BD C45A    1207            JMP     SLEEP           ;YES, BATTERY CHECK THEN SLEEP
             1208
07BF F0      1209 PAUSXX:    MOV     A,@R0
07C0 DD      1210            XRL     A,R5            ;IF PRESENT SEC. = SAVE SEC.
07C1 C62E    1211            JZ      PAUSE2          ;THEN LOOP
07C3 F0      1212            MOV     A,@R0
07C4 AD      1213            MOV     R5,A            ;SAVE PRESENT SEC.
07C5 FA      1214            MOV     A,R2
07C6 D4B6    1215            CALL    DECBCD          ;DEC SEC.
```

```
07C8 AA         1216            MOV     R2,A
07C9 4B         1217            ORL     A,R3
07CA 4C         1218            ORL     A,R4
07CB C6DD       1219            JZ      PAUSE8
07CD E62E       1220 PAUSE3:    JNC     PAUSE2
07CF BA59       1221            MOV     R2,#59H
07D1 FB         1222            MOV     A,R3
07D2 D4B6       1223            CALL    DECBCD          ;DEC MIN. (LSB) IF BORROW
07D4 AB         1224            MOV     R3,A
07D5 E62E       1225            JNC     PAUSE2
07D7 FC         1226            MOV     A,R4
07D8 D4B6       1227            CALL    DECBCD          ;DEC MIN.. (MSB) IF BORROW
07DA AC         1228            MOV     R4,A
07DB E42E       1229            JMP     PAUSE2
                1230
07DD C5         1231 PAUSE8:    SEL     RB0             ;*** SELECT R. BANK 0 ***
                1232                                    ;TIME = 000:00, SO EXIT
07DE B802       1233            MOV     R0,#2
07E0 B90E       1234            MOV     R1,#TEMP
07E2 BE04       1235            MOV     R6,#4
07E4 F1         1236 PAUSE9:    MOV     A,@R1
07E5 A0         1237            MOV     @R0,A
07E6 18         1238            INC     R0
07E7 19         1239            INC     R1
07E8 EEE4       1240            DJNZ    R6,PAUSE9       ;RESTORE R2-R5
07EA F1         1241            MOV     A,@R1
07EB 62         1242            MOV     T,A             ;RESTORE TIMER COUNTER
07EC 19         1243            INC     R1
07ED B81C       1244            MOV     R0,#XR+4
07EF F1         1245            MOV     A,@R1
07F0 A0         1246            MOV     @R0,A           ;RESTORE XR4
07F1 18         1247            INC     R0
07F2 F0         1248            MOV     A,@R0           ;GET SWITCH STATUS
07F3 53F7       1249            ANL     A,#11110111B    ;CLEAR TIME FLAG
07F5 A0         1250            MOV     @R0,A           ;EXIT IN MILEAGE MODE
07F6 FF         1251            MOV     A,R7
07F7 A8         1252            MOV     R0,A            ;RESTORE R0
07F8 8490       1253            JMP     SPEED1          ;CHECK FOR ANOTHER PAUSE
07F9            1254 PAGE7X     EQU     $-1
                1255 $EJECT
                1256 $INCLUDE (CTABLE.02)
              *1257 ;***************************************************************
              *1258 ;*
              =1259 ;*          PAGE 3 -         MILES PER HOUR TABLE
              =1260 ;*
              =1261 ;*                           RTC INTERUPTS, TIMER COUNTS
              =1262 ;*                           TO INCRMENT MILEAGE BY .01
              =1263 ;*
              =1264 ;*                           RTC INTERUPTS = 50 msec.
              =1265 ;*                           TIMER COUNT   = 195.3125 usec.
              =1266 ;*
              =1267 ;*          DB      A,B      ;A = INT(720/MPH), B = REM(720/MPH)*256
              =1268 ;*
              *1269 ;***************************************************************
                1270
0300          =1271            ORG     300H
0300          =1272 PAGE3      EQU     $
0300 09       =1273            DB      9,0      ;80 MPH
0301 00       =
0302 08       =1274            DB      8,228    ;81 "
0303 E4       =
0304 08       =1275            DB      8,200    ;82 "
0305 C8       =
0306 F0       *1276            DB      240,0    ; 3 MPH
0307 00       =
0308 B4       =1277            DB      180,0    ; 4
0309 00       =
030A 90       =1278            DB      144,0    ; 5
030B 00       =
030C 78       =1279            DB      120,0    ; 6
030D 00       =
030E 66       =1280            DB      102,219  ; 7
030F DB       =
0310 5A       =1281            DB      90,0     ; 8
0311 00       =
0312 50       =1282            DB      80,0     ; 9
0313 00       =
              =1283
```

```
0320            =1284           ORG     PAGE3+20H
0320 48         =1285           DB      72,0        ;10 MPH
0321 00         =
0322 41         =1286           DB      65,116      ;11
0323 74         =
0324 3C         =1287           DB      60,0        ;12
0325 00         =
0326 37         =1288           DB      55,98       ;13
0327 62         =
0328 33         =1289           DB      51,110      ;14
0329 6E         =
032A 30         =1290           DB      48,0        ;15
032B 00         =
032C 2D         =1291           DB      45,0        ;16
032D 00         =
032E 2A         =1292           DB      42,90       ;17
032F 5A         =
0330 28         =1293           DB      40,0        ;18
0331 00         =
0332 25         =1294           DB      37,229      ;19 MPH
0333 E5         =
                =1295
0340            =1296           ORG     PAGE3+40H
0340 24         =1297           DB      36,0        ;20 MPH
0341 00         =
0342 22         =1298           DB      34,73
0343 49         =
0344 20         =1299           DB      32,186
0345 BA         =
0346 1F         =1300           DB      31,78
0347 4E         =
0348 1E         =1301           DB      30,0
0349 00         =
034A 1C         =1302           DB      28,205
034B CD         =
034C 1B         =1303           DB      27,177
034D B1         =
034E 1A         =1304           DB      26,171
034F AB         =
0350 19         =1305           DB      25,183
0351 B7         =
0352 18         =1306           DB      24,212      ;29 MPH
0353 D4         =
                =1307
0360            =1308           ORG     PAGE3+60H
0360 18         =1309           DB      24,0        ;30 MPH
0361 00         =
0362 17         =1310           DB      23,58
0363 3A         =
0364 16         =1311           DB      22,128
0365 80         =
0366 15         =1312           DB      21,209
0367 D1         =
0368 15         =1313           DB      21,45
0369 2D         =
036A 14         =1314           DB      20,146
036B 92         =
036C 14         =1315           DB      20,0
036D 00         =
036E 13         =1316           DB      19,118
036F 76         =
0370 12         =1317           DB      18,243
0371 F3         =
0372 12         =1318           DB      18,118      ;39 MPH
0373 76         =
                =1319
0380            =1320           ORG     PAGE3+80H
0380 12         =1321           DB      18,0        ;40 MPH
0381 00         =
0382 11         =1322           DB      17,144
0383 90         =
0384 11         =1323           DB      17,37
0385 25         =
0386 10         =1324           DB      16,191
0387 BF         =
0388 10         =1325           DB      16,93
0389 5D         =
038A 10         =1326           DB      16,0
```

```
038B 00       =
038C 0F       =1327      DB    15,167
038D A7       =
038E 0F       =1328      DB    15,82
038F 52       =
0390 0F       =1329      DB    15,0
0391 00       =
0392 0E       =1330      DB    14,178   ;49 MPH
0393 B2       =
              =1331
03A0          =1332      ORG   PAGE3+0A0H
03A0 0E       =1333      DB    14,102   ;50 MPH
03A1 66       =
03A2 0E       =1334      DB    14,30
03A3 1E       =
03A4 0D       =1335      DB    13,217
03A5 D9       =
03A6 0D       =1336      DB    13,150
03A7 96       =
03A8 0D       =1337      DB    13,85
03A9 55       =
03AA 0D       =1338      DB    13,23
03AB 17       =
03AC 0C       =1339      DB    12,219
03AD DB       =
03AE 0C       =1340      DB    12,162
03AF A2       =
03B0 0C       =1341      DB    12,106
03B1 6A       =
03B2 0C       =1342      DB    12,52
03B3 34       =
              =1343
03C0          =1344      ORG   PAGE3+0C0H
03C0 0C       =1345      DB    12,0     ;60 MPH
03C1 00       =
03C2 0B       =1346      DB    11,205   ;61
03C3 CD       =
03C4 0B       =1347      DB    11,157   ;62
03C5 9D       =
03C6 0B       =1348      DB    11,110   ;63
03C7 6E       =
03C8 0B       =1349      DB    11,64    ;64
03C9 40       =
03CA 0B       =1350      DB    11,20    ;65
03CB 14       =
03CC 0A       =1351      DB    10,233   ;66
03CD E9       =
03CE 0A       =1352      DB    10,191   ;67
03CF BF       =
03D0 0A       =1353      DB    10,151   ;68
03D1 97       =
03D2 0A       =1354      DB    10,111   ;69
03D3 6F       =
              =1355
03E0          =1356      ORG   PAGE3+0E0H
03E0 0A       =1357      DB    10,73    ;70 MPH
03E1 49       =
03E2 0A       =1358      DB    10,36    ;71
03E3 24       =
03E4 0A       =1359      DB    10,0     ;72
03E5 00       =
03E6 09       =1360      DB    9,221    ;73
03E7 DD       =
03E8 09       =1361      DB    9,187    ;74
03E9 BB       =
03EA 09       =1362      DB    9,154    ;75
03EB 9A       =
03EC 09       =1363      DB    9,121    ;76
03ED 79       =
03EE 09       =1364      DB    9,90     ;77
03EF 5A       =
03F0 09       =1365      DB    9,59     ;78
03F1 3B       =
03F2 09       =1366      DB    9,29     ;79
03F3 1D       =
              =1367
03F3          =1368 PAGE3X  EQU   $-1
              =1369
              =1370 $EJECT
```

```
                =1371
                =1372
                =1373  ;******************************************************************
                =1374  ;*
                =1375  ;*          POSSIBLE TABLE:
                =1376  ;*                  EACH ENTRY IS THE NUBER OF TENTHS BETWEEN
                =1377  ;*                  POSSIBLES
                =1378  ;*
                =1379  ;*          EXAMPLE: AT 26 MPH POSSIBLES
                =1380  ;*                   OCCUR ON 1.3 MILE INCREMENTS
                =1381  ;*
                =1382  ;*               DB       13H              ;26 MPH
                =1383  ;*
                =1384  ;******************************************************************
                =1385
0400            =1386            ORG      400H            ;MPH
0400 00         =1387  PAGE4:    DB       0,0,0           ;0,1,2 MPH NOT USED
0401 00         =
0402 00         =
0403 01         =1388            DB       01H             ; 3
0404 02         =1389            DB       02H             ; 4
0405 05         =1390            DB       05H             ; 5
0406 01         =1391            DB       01H             ; 6
0407 07         =1392            DB       07H             ; 7
0408 04         =1393            DB       04H             ; 8
0409 03         =1394            DB       03H             ; 9
                =1395
0410            =1396            ORG      410H
0410 05         =1397            DB       05H             ;10
0411 11         =1398            DB       11H             ;11
0412 02         =1399            DB       02H             ;12
0413 13         =1400            DB       13H             ;13
0414 07         =1401            DB       07H             ;14
0415 05         =1402            DB       05H             ;15
0416 08         =1403            DB       08H             ;16
0417 17         =1404            DB       17H             ;17
0418 03         =1405            DB       03H             ;18
0419 19         =1406            DB       19H             ;19
                =1407
0420            =1408            ORG      420H
0420 10         =1409            DB       10H             ;20
0421 07         =1410            DB       07H             ;21
0422 11         =1411            DB       11H             ;22
0423 23         =1412            DB       23H             ;23
0424 04         =1413            DB       04H             ;24
0425 25         =1414            DB       25H             ;25
0426 13         =1415            DB       13H             ;26
0427 09         =1416            DB       09H             ;27
0428 14         =1417            DB       14H             ;28
0429 29         =1418            DB       29H             ;29
                =1419
0430            =1420            ORG      430H
0430 05         =1421            DB       05H             ;30
0431 31         =1422            DB       31H             ;31
0432 16         =1423            DB       16H             ;32
0433 11         =1424            DB       11H             ;33
0434 17         =1425            DB       17H             ;34
0435 35         =1426            DB       35H             ;35
0436 06         =1427            DB       06H             ;36
0437 37         =1428            DB       37H             ;37
0438 19         =1429            DB       19H             ;38
0439 13         =1430            DB       13H             ;39
                =1431
0440            =1432            ORG      440H
0440 20         =1433            DB       20H             ;40
0441 41         =1434            DB       41H             ;41
0442 07         =1435            DB       07H             ;42
0443 43         =1436            DB       43H             ;43
0444 22         =1437            DB       22H             ;44
0445 15         =1438            DB       15H             ;45
0446 23         =1439            DB       23H             ;46
0447 47         =1440            DB       47H             ;47
0448 08         =1441            DB       08H             ;48
0449 49         =1442            DB       49H             ;49
                =1443
0450            =1444            ORG      450H
0450 25         =1445            DB       25H             ;50
0451 17         =1446            DB       17H             ;51
```

```
0452 26        =1447         DB      26H            ;52
0453 53        =1448         DB      53H            ;53
0454 09        =1449         DB      09H            ;54
0455 55        =1450         DB      55H            ;55
0456 28        =1451         DB      28H            ;56
0457 19        =1452         DB      19H            ;57
0458 29        =1453         DB      29H            ;58
0459 59        =1454         DB      59H            ;59
               =1455
0460           =1456         ORG     460H
0460 10        =1457         DB      10H            ;60
0461 61        =1458         DB      61H            ;61
0462 31        =1459         DB      31H            ;62
0463 21        =1460         DB      21H            ;63
0464 32        =1461         DB      32H            ;64
0465 65        =1462         DB      65H            ;65
0466 11        =1463         DB      11H            ;66
0467 67        =1464         DB      67H            ;67
0468 34        =1465         DB      34H            ;68
0469 23        =1466         DB      23H            ;69
               =1467
0470           =1468         ORG     470H
0470 35        =1469         DB      35H            ;70
0471 71        =1470         DB      71H            ;71
0472 12        =1471         DB      12H            ;72
0473 73        =1472         DB      73H            ;73
0474 37        =1473         DB      37H            ;74
0475 25        =1474         DB      25H            ;75
0476 38        =1475         DB      38H            ;76
0477 77        =1476         DB      77H            ;77
0478 13        =1477         DB      13H            ;78
0479 79        =1478         DB      79H            ;79
               =1479
0480           =1480         ORG     480H
0480 40        =1481         DB      40H            ;80
0481 27        =1482         DB      27H            ;81
0482 41        =1483         DB      41H            ;82
               =1484
               =1485 $EJECT
                1486         END
```

```
USER SYMBOLS
BOTH1   0086   BOTH2   0087   CHECK   0605   CHECKA  060B
CKPNT   00E8   CLRRAM  0220   CNTI02  00A1   CNTI03  00A5
DEC1X   06C2   DECBCD  06B6   DLY0    0122   DLY1    01D0
DSPLY4  0534   DSPLY5  051B   DSPLY6  0542   DSPON   0528
EX0005  0548   EX0006  0561   EX0008  0565   EX0009  0566
EXEC2   00C3   EXEC4   00D1   EXEC6   00D5   EXLOOP  0500
IDLE2   068A   IEXEC   00A7   INIT1   0230   INIT2   023F
JEXEC   06A2   LEAP    04A5   LEAP2   04B9   MILE0   0179
MILE2A  01B0   MILE3   01C5   MILE30  0177   MILE4   0105
MOVP4   0483   MPH1    0100   MPH2    0105   MPH3    010C
MPH7    0142   MPH8    0146   OFF1    004C   OFF1A   0050
ON2     0063   ON2A    0069   OUTD    06AA   OUTLSB  06A8
PO1015  0757   PO10XX  0775   PO1102  075F   PO1115  0765
PAGE1X  01FF   PAGE2   0200   PAGE2X  0272   PAGE3   0300
PAGE5X  05F6   PAGE6   05F7   PAGE6X  06C6   PAGE7   0700
PAUS05  078B   PAUS15  078F   PAUSE   0700   PAUSE1  0708
PAUSX   07B6   PAUSXX  07BF   POSS10  0594   POSS18  05AD
PSBL    0014   REG     0000   RESET   0000   SLEEP   065A
SLEEP4  0697   SP1     049B   SPEED   0485   SPEED1  0490
STORE1  020D   STORE2  021A   SW0     002D   SW1     002F
SWOFF1  0047   SWOFF2  006F   TEMP    000E   USRRAM  0023
XSPEED  048F

CHECKB  0614   CHK10   0619   CHK12   063E   CHK20   0641
CNTI1A  0020   CNTI2A  008D   CNTINT  0007   D005    0520
DLY2    0633   DLY3    064A   DSPLY   0500   DSPLY1  0508
DSPTIM  050F   ENDMPH  0082   ENDPRG  01BB   ENTRY   0590
EX0010  0568   EX0020  0571   EX0030  05CD   EXEC1   00AA
EXTINT  0003   FLASH   055F   FLGS    0017   IDLE1   0259
INIT3   0250   INIT4   0264   INIT5   0269   INITZ   021D
MILE01  015C   MILE1   019D   MILE12  0199   MILE2   01A3
MILE44  01E7   MILE46  01E9   MILE48  01EB   MILES   014A
MPH3A   0117   MPH4    0127   MPH5    012A   MPH6    0140
OFF2    0074   OFF2A   0078   ON1     003B   ON1A    0041
OUTMSB  06A4   P005    0743   P008    0749   P010    074C
```

| | | | | | | | |
|---|---|---|---|---|---|---|---|
| P020 | 076B | PAGE0 | 0000 | PAGE0X | 00FC | PAGE1 | 0100 |
| PAGE3X | 03F3 | PAGE4 | 0400 | PAGE4X | 04BA | PAGE5 | 0500 |
| PAGE7X | 07F9 | PAUS00 | 077C | PAUS01 | 0784 | PAUS02 | 0797 |
| PAUSE2 | 072E | PAUSE3 | 07CD | PAUSE8 | 07DD | PAUSE9 | 07E4 |
| POSS19 | 05E1 | POSS20 | 0603 | PREMPH | 0016 | PRGRAM | 0026 |
| SLEEP0 | 0670 | SLEEP1 | 0675 | SLEEP2 | 067B | SLEEP3 | 0683 |
| STACK | 0008 | STAMPH | 0003 | STOMIL | 01F7 | STORE0 | 0209 |
| SW1X | 0055 | SW2 | 0057 | SW2X | 007D | SWCHTS | 0023 |
| WAIT | 05C0 | WAKE1 | 0260 | WAKE2 | 0691 | XR | 0018 |

ASSEMBLY COMPLETE,    NO ERRORS

I claim:

1. A pacing apparatus for enduro motorcycle racing, comprising:
   (a) input means, for inputting into said apparatus, values representing a desired speed for and length of an enduro race segment;
   (b) computing means for automatically computing should-be distance, and for automatically computing a plurality of locations at which an unannounced enduro race check point would be possible along a course of an enduro race, from values provided via said input means;
   (c) means for initiating said computing means; and
   (d) display means, electrically connected to said computing means, for visually displaying to a rider manipulating a motorcycle, should-be distance and an indication of locations at which an unannounced enduro race checkpoint would be possible along a course of an enduro race, wherein at any given time during a race:
   a should-be distance which is displayed on said display means represents a distance the motorcycle should have travelled up until the given time for comparison with a distance the motorcycle has actually travelled up until the given time, and
   a location, which is indicated upon said display means, whereat an unannounced enduro race check point would be possible, is beyond the should-be distance displayed at the given time, and before all other locations at which an unannounced enduro race check point would be possible.

2. The apparatus in accordance with claim 1, further comprising:
   memory means, electrically interconnected with said input means and said computing means, providing for values of a plurality of race segments to be sequentially input, and displayed, and wherein said display means comprises a first display portion and a second display portion, said should-be distance being displayed on said first display portion, and said location being indicated on said second display portion, said should-be distance being displayed concurrently with said location.

3. The apparatus as described in claim 2 above wherein:
   (a) said first display portion comprises a digital display, for decimally displaying miles, tenths of miles, hundredths of miles; and
   (b) said second display portion further comprises a digital display for showing a tenths of a mile value corresponding to a tenths of a mile value of should-be distance at which said location occurs.

4. The apparatus as described in claim 2 above wherein said first display portion is located adjacent to said second display portion and wherein further said second display portion is flashing.

5. The apparatus as described in claim 2 wherein said plurality of race segments include both segments at which the motorcycle should proceed a distance at a constant speed and segments at which the motorcycle should not proceed for a given time period, all as part of an overall race schedule.

6. The apparatus as described in claim 5 above wherein said plurality of race segments include a start segment for synchronizing with a start time of a given rider in an enduro race.

7. The apparatus as described in claim 6 above wherein said start segment comprises a time countdown display from a pre-chosen time in a start sequence of an Enduro race to the start time of a given rider.

8. The apparatus as described in claim 7 above wherein said means for initiating the computing means includes:
   means for bypassing said time countdown display.

9. The apparatus as described in claim 2 above, wherein said apparatus further comprises:
   means, electrically connected with said memory means and said computing means, for providing for resetting of the should-be distance to an arbitrary value at the beginning of at least one of said plurality of race segments.

10. A pacing apparatus for use, in conjunction with an odometer means, during an enduro motorcycle race having a plurality of race segments, each race segment having a predetermined length and a predetermined desired time duration, said apparatus comprising:
    memory means;
    input means for inputting into said memory means, prior to the beginning of a race, values representing the length and desired time duration of each race segment;
    computing means for automatically computing should-be distance, and for automatically computing a plurality of locations at which an unannounced enduro race check point would be possible along a course of an enduro race, from values provided via said input means;
    means for intiating said computing means;
    display means, electrically connected to said computing means, for visually displaying to a rider manipulating a motorcycle, should-be distance and an indication of locations at which an unannounced enduro race check point would be possible along a course of an enduro race, wherein at any given time during a race:
    a should-be distance which is displayed on said display means represents a distance which should be indicated on said odometer means at the given time; and
    a location, at which an unannounced enduro race check point would be possible, which is indicated upon said display means is beyond the should-be distance displayed at the given time and before all other locations at which an unannounced enduro race check point would be possible beyond the should-be distance displayed at the given time.

11. The apparatus of claim 10, wherein:
said display means comprises a first display portion and a second display portion, said should-be distance being displayed on said first display portion, and said location being indicated on said second display portion, said should-be distance being displayed concurrently with said location.

12. The apparatus of claim 11, wherein:
said first display portion comprises a digital display, for decimally displaying miles, tenths of miles and hundredths of miles; and
said second display portion comprises a digital display for showing a tenth of a mile value corresponding to a tenth of a mile value of should-be distance at which said location occurs.

13. The apparatus of claim 11, wherein said first display portion is located adjacent said second display portion and wherein said second display portion flashes.

14. The apparatus of claim 10, wherein said plurality of race segments includes segments during which the motorcycle should proceed a distance at a constant speed and segments during which the motorcycle should not proceed for a predetermined time period.

15. The apparatus of claim 14, wherein said plurality of race segments includes a start segment for synchronizing with a start time of a given rider in an enduro race.

16. The apparatus of claim 15, wherein said start segment comprises a time countdown from a pre-chosen time in a start sequence of an enduro race to the start time of a given rider.

17. The apparatus of claim 16, wherein said means for initiating the computing means includes means for by-passing said time countdown.

18. The apparatus of claim 10, further comprising:
means, electrically connected with said memory means and said computing means, for automatically resetting the should-be distance to an arbitrary value at the beginning of at least one of said plurality of race segments.

19. A pacing apparatus for use in conjunction with an odometer means during an enduro motorcycle race having a plurality of race segments, each race segment having a predetermined length and a predetermined desired time duration, said plurality of race segments including segments during which a motorcycle should proceed a distance at a constant speed and segments during which the motorcycle should not proceed for a predetermined time period, said apparatus comprising:
memory means;
input means for inputting into said memory means, prior to the beginning of a race, values representing the length and desired time duration of each race segment;
computing means for automatically computing should-be distance, and for automatically computing a plurality of locations at which an unannounced enduro race check point would be possible along a course of an enduro race, from values provided via said input means;
means, electrically connected with said memory means and said computing means, for automatically resetting the should-be distance to an arbitrary value at the beginning of at least one of the race segments;
means for initiating said computing means;
display means, electrically connected to said computing means, for visually displaying to a rider manipulating a motorcycle, should-be distance and an indication of locations at which an unannounced enduro race check point would be possible along a course of an enduro race, wherein at any given time during a race:
a should-be distance which is displayed on said display means represents a distance which should be indicated on said odometer means at the given time; and
a location, at which an unannounced enduro race check point would be possible, which is indicated upon said display means is beyond the should-be distance displayed at the given time and before all other locations at which an unannounced enduro race check point would be possible beyond the should-be distance displayed at the given time.

* * * * *